(12) United States Patent
Reddy et al.

(10) Patent No.: US 8,673,257 B2
(45) Date of Patent: *Mar. 18, 2014

(54) APPARATUS AND METHOD TO SEQUESTER CONTAMINANTS

(75) Inventors: Katta J. Reddy, Laramie, WY (US);
Morris D. Argyle, Laramie, WY (US)

(73) Assignee: University of Wyoming, Laramie, WY (US)

( * ) Notice: Subject to any disclaimer, the term of this patent is extended or adjusted under 35 U.S.C. 154(b) by 1268 days.

This patent is subject to a terminal disclaimer.

(21) Appl. No.: 12/415,871

(22) Filed: Mar. 31, 2009

(65) Prior Publication Data

US 2009/0263301 A1    Oct. 22, 2009

Related U.S. Application Data

(63) Continuation-in-part of application No. 12/215,638, filed on Jun. 27, 2008, now Pat. No. 7,879,305, which is a continuation of application No. PCT/US2006/049411, filed on Dec. 28, 2006.

(60) Provisional application No. 60/755,959, filed on Jan. 3, 2006.

(51) Int. Cl.
*B01D 53/56* (2006.01)
*B01D 47/00* (2006.01)

(52) U.S. Cl.
USPC ............ 423/432; 423/210; 423/220; 166/402

(58) Field of Classification Search
USPC .......................... 423/432, 210, 220; 166/402
See application file for complete search history.

(56) References Cited

U.S. PATENT DOCUMENTS

| | | | |
|---|---|---|---|
| 2,947,656 A | 8/1960 | Bailey | |
| 3,495,941 A | 2/1970 | Van Helden | |
| 3,578,390 A | 5/1971 | Kruel et al. | |
| 3,873,673 A * | 3/1975 | Teague et al. | ............. 423/242.7 |
| 3,932,587 A | 1/1976 | Grantham et al. | |
| 4,101,172 A | 7/1978 | Rabbitts | |
| 4,228,139 A | 10/1980 | Johnson | |
| 4,244,709 A | 1/1981 | Chang | |
| 4,412,914 A | 11/1983 | Hettinger, Jr. et al. | |
| 4,495,163 A | 1/1985 | Nguyen | |

(Continued)

FOREIGN PATENT DOCUMENTS

| | | |
|---|---|---|
| WO | 0185307 A1 | 11/2001 |
| WO | WO0185307 | 11/2001 |

OTHER PUBLICATIONS

We Energies Coal Combustion Products Utilization Handbook—Chapter 2 "CCPs and Electric Power Generation"—Publication 2004.*

(Continued)

*Primary Examiner* — Walter D Griffin
*Assistant Examiner* — Huy-Tram Nguyen
(74) *Attorney, Agent, or Firm* — Hogan Lovells US LLP

(57) ABSTRACT

The invention relates to an apparatus and method for reducing contaminants from industrial processes. More particularly, the invention is directed to a method of sequestering pollutants from flue gases in operational plants. The method includes sequestering contaminants from a point source by reacting an alkaline material with a flue gas containing contaminants to be sequestered, wherein the reaction has a rapid mass transfer rate to sequester at least a portion of the contaminants.

24 Claims, 9 Drawing Sheets

(56) References Cited

U.S. PATENT DOCUMENTS

| | | | |
|---|---|---|---|
| 4,969,930 A | 11/1990 | Arpalahti | |
| 5,100,633 A * | 3/1992 | Morrison | 423/225 |
| 5,275,230 A | 1/1994 | Balling et al. | |
| 5,502,021 A | 3/1996 | Schuster | |
| 5,817,282 A | 10/1998 | Radlein et al. | |
| 6,001,152 A * | 12/1999 | Sinha | 95/58 |
| 6,843,831 B2 | 1/2005 | van de Kleut et al. | |
| 2001/0042716 A1 | 11/2001 | Iversen et al. | |
| 2001/0054253 A1 | 12/2001 | Takahashi et al. | |
| 2003/0056700 A1* | 3/2003 | Hume et al. | 110/341 |
| 2003/0161771 A1* | 8/2003 | Oehr | 423/210 |
| 2004/0200393 A1 | 10/2004 | Zauderer | |
| 2004/0213705 A1 | 10/2004 | Blencoe et al. | |
| 2004/0228788 A1 | 11/2004 | Nagai et al. | |
| 2004/0266933 A1 | 12/2004 | Friedman et al. | |
| 2005/0002847 A1 | 1/2005 | Maroto-Valer et al. | |
| 2005/0036932 A1 | 2/2005 | Takahashi et al. | |
| 2005/0238563 A1 | 10/2005 | Eighmy et al. | |
| 2006/0185560 A1 | 8/2006 | Ramme et al. | |
| 2007/0168213 A1* | 7/2007 | Comrie | 705/1 |
| 2008/0267838 A1 | 10/2008 | Reddy et al. | |
| 2009/0169452 A1 | 7/2009 | Constantz et al. | |
| 2010/0221163 A1 | 9/2010 | DaCosta et al. | |

OTHER PUBLICATIONS

American Coal Ash Association 2007 Production and Use Survey. http://www.acaa-usa.org/diplaycommon.cfm?an=1&subarticlenbr=3, Nov. 5, 2008, 1 page.
Biello, David, "Cement from CO2: A Concrete Cure for Global Warming?", Scientific American, http://www.calera.com/pdf/scientific_american%20copy.pdf, Aug. 7, 2008, pp. 2.
Reddy, et al., "Development of a Carbon Dioxide Pressure Technique for Chemical Stabilization of Alkaline Clean Coal Technology (CCT) Ash", Electric Power Research Institute (EPRI), Palo Alto, CA, 1995, TR-104840, pp. 1-36.
International Search Report of the International Searching Authority, or the Declaration, PCT/US2009/42379, mailed Aug. 20, 2009, pp. 3.
Stumm, et al. "Aquatic Chemistry: Chemical Equilibria and Rates in Natural Waters," 3rd Edition, John Wiley & Sons, New York, 1996, Third Edition, Chapter 9, The Solid-Solution Interface, pp. 517-594.
Tyson, "Proceedings of the Third Annual Conference on Unburned Carbon on Utility Fly Ash," US Department of Energy, FETC, May 1997, Unintended Effects of NOx Emission Control Strategies on Unburned Carbon and CCP Marketability, pp. 3-5.
Written Opinion of the International Searching Authority, PCT/US2009/42379, mailed Aug. 20, 2009, pp. 5.
Montes-Hernandez, G., et al., "Mineral sequestration of CO2 by aqueous carbonation of coal combustion fly-ash", Journal of Hazardous Materials, Apr. 24, 2008, pp. 8, Elsevier.
Perez-Lopez, R., et al. "Carbonation of alkaline paper mill waste to reduce CO2 greenhouse gas emissions into the atmosphere", Applied Geochemistry 23 (2008) 2292-2300, Elsevier.
"The Solid-Solution Interface", No Date, pp. 516-594.
Adariano, D.C., et al., "Utilization and Disposal of Fly Ash and Other Coal Residues in Terrestrial Ecosystems: A Review", Journal of Environmental Quality, Reviews and Analyses, vol. 9, Jul.-Sep. 1980, No. 3, 333-344.
Pichtel, J.R., "Microbial Respiration in Fly Ash/Sewage Sludge-Amended Soils", Environmental Pollution 63 (1990) 225-237, Elsevier Science Publishers Ltd, England.
"Summary of the Second Conference on Unburned Carbonaceous Material on Utility Fly Ash", Mar. 1996, The Third Conference on Unburned Carbon on Utility Fly Ash, pp. i, 1-83.
Herzog, Howard, "An Introduction to CO2 Separation and Capture Technologies", MIT Energy Laboratory, Aug. 1999.pp. 1-8.
Reynolds, Steven P., et al., "New Pressure Swing Adsorption Cycles for Carbon Dioxide Sequestration", Adsorption 11: 531-536, 2005, Springer Science + Business Media, Inc., The Netherlands.
Kintisch, Eli, "Making Dirty Coal Plants Cleaner", Science, vol. 317, Jul. 13, 2007, pp. 184-186.
Lackner, Klaus S., "A Guide to CO2 Sequestration", Science, vol. 300, Jun. 13, 2003, pp. 1677-1678, 1.
Reddy, K.J., et al., "Solubility Relationships and Mineral Transformations Associated with Recarbonation of Retorted Shales", J. Environ. Qual., vol. 15, No. 2, 1986, pp. 129-133.
Reddy, K. J., et al., "Availability and Plant Uptake of Trace Elements from Recarbonated Retorted Shale", J. Environ. Qual., vol. 16, No. 2, 1987, pp. 168-171.
Reddy, K.J., et al., "Effects of a carbon dioxide pressure process on the solubilities of major and trace elements in oil shale solid wastes", Environ. Sci. Technol., 1991, 25 (8), 1466-1469, American Chemical Society, Washington, D.C.
Reddy, K.J., et al., "Reaction of CO2 with Alkaline Solid Wastes to Reduce Contaminant Mobility", Pergamon, Wat. Res. vol. 28, No. 6, pp. 1377-1382, 1994, Elsevier Science Ltd.
Tawfic, T.A., et al., "Reaction of CO2 with Clean Coal Technology Ash to Reduce Trace Element Mobility", Water, Air and Soil Pollution 84: 385-398, 1995, Kluwer Academic Publishers, The Netherlands.
Reddy, K.J., et al., "Development of a Carbon Dioxide Pressure Technique for Chemical Stabilization of Alkaline Clean Coal Technology (CCT) Ash", Electric Power Research Institute, Wyoming Water Resources Center/ University of Wyoming, Laramie, WY, Jun. 1995, pp. i-x, 1-36.
Reddy, K.J., "Application of Carbon Dioxide in Remediation of Contaminants: A New Approach", University of Wyoming, Laramie, WY, No Date, pp. 829-838.
Meima, Jeannet A., et al., "Carbonation processes in municipal solid waste incinerator bottom ash and their effect on the leaching of copper and molybdenum", Applied Geochemistry 17 (2002) 1503-1513, Pergamon.
Ecke, Holger, et al., "Carbonation of Municipal Solid Waste Incineration Fly Ash and the Impact on Metal Mobility", Journal of Environmental Engineering © ASCE, May 2003, pp. 435-440.
Kim, Sang-Yul, et al., "Evaluation of pre-treatment methods for landfill disposal of residues from municipal solid waste incineration", Waste Management & Research, 2003, 416-425.
Ahn, Ji-Whan, et al., "Characteristic of Carbonation Reaction from Municipal Solid Waste Incinerator Bottom Ash as a Function of Water Content and Their Effect on the Stabilization of Copper and Lead", Materials Science Forum vols. 544-545 (2007), pp. 533-536, Trans Tech Publications, Switzerland.
Bertos, Fernandez M., et al., "A review of accelerated carbonation technology in the treatment of cement-based materials and sequestration of CO2", Journal of Hazardous Materials B112 (2004), 193-205, Elsevier.
Huijgen, Wouter, J. J., et al.,"Carbonation of Steel Slag for CO2 Sequestration: Leaching of Products and Reaction Mechanisms", Environ. Sci. Technol. 2006, vol. 40, No. 8, 2790-2796.
Baciocchi, Renato, et al., "CO2 Sequestration by Direct Gas-Solid Carbonation of Air Pollution Control (APC) Residues", Energy Fuels, 2006, American Chemical Society, 20(5), pp. 10.
Huijgen, Wouter, J. J., et al., "Mechanisms of aqueous wollastonite carbonation as a possible CO2 sequestration process", Chemical Engineering Science 61 (2006) 4242-4251, Elsevier.
Gerdemann, Stephen J., et al., "Ex Situ Aqueous Mineral Carbonation", Environ. Sci. Technol. 2007, vol. 41, No. 7, 2587-2593.
Costa, Giulia, et al., "Current status and perspectives of accelerated carbonation processes on municipal waste combustion residues," Environ Monit Assess (2007), 135:55-75, Springer.
Theis, Thomas L., et al. "Sorptive behavior of trace metals on fly ash in aqueous systems", Environ. Sci. Technol., 1977, 11 (12), 1096-1100, American Chemical Society, Washington DC.
Essington, M.E., "Trace Element Mineral Transformations Associated with Hydration and Recarbonation of Retorted Oil Shale", Environ. Geol Water Sci. vol. 13, No. 1, 1989, 59-66, Springer-Verlag New York Inc.
Atimtay, Aysel T., "Cleaner energy production with integrated gasification combined cycle systems and use of metal oxide sorbents for H2S cleanup from coal gas", Clean Products and Processes 2 (2001), 197-208, Springer-Verlag New York Inc.
2007 Coal Combustion Product (CCP) Production & Use Survey Results (Revised), ACAA, Sep. 15, 2008, p. 1.

(56) References Cited

OTHER PUBLICATIONS

Huijgen, Wouter, J. J. et al., "Mineral CO Sequestration by Steel Slag Carbonation", Environmental Science & Technology, 2005, 39 (24) 9676-9682, American Chemical Society, Washington, D.C.

Zhang, Hua, et al., "Temporary stabilization of air pollution control residues using carbonation", Waste Management 20 (2008), 509-517, Elsevier Ltd.

Piwoni, Marvin D. and Keeley, Jack W., "Basic Concepts of Contaminant Sorption at Hazardous Waste Sites", Ground Water Issue, Superfund Technology Support Center for Ground Water, p. 1-7, Robert S. Kerr Environmental Research Laboratory, Ada, OK McClean, Joan E. and Bledsoe, Bert E., "Behavior of Metals in Soils", Ground Water Issue, Superfund Technology Support Group for Ground Water, p. 1-25, Robert S. Kerr Environmental Research Laboratory, Ada, OK.

Palumbo, Anthony V., et al., "Fly Ash Characteristics and Carbon Sequestration Potential", World of Coal Ash, May 7-10, 2007, Covington, KY.

Palumbo, A.V., et al. "Issues with the Use of Fly Ash for Carbon Sequestration".

Montague, Peter, "Carbon sequestration and the precautionary principle", Gristmill, http://gristmill.grist.org/stroy/2007/11/10/151448/65, posted Nov. 12, 2007, as printed Dec. 3, 2008.

Plasynski, Sean, et al., "Project Facts: Carbon Dioxide Capture by Absorption with Potassium Carbonate", Apr. 2008, U.S. Department of Energy, Office of Fossil Energy, National Energy Technology Laboratory.

White, Curt M. and Diane Newlon, "R&D Facts: Carbon Sequestration Science", Jun. 2002, U.S. Department of Energy, Office of Fossil Energy, National Energy Technology Laboratory.

Written Opinion in PCT/US2006/049411 mailed Oct. 2, 2007.

"Perry's Chemical Engineers' Handbook", 7th ed., Robert H. Perry, Don w. Green and James O. Maloney, Editors, 1997, 17-1-17-19, McGraw-Hill.

* cited by examiner

502

504

602

604

APPARATUS AND METHOD TO SEQUESTER CONTAMINANTS

This application claims benefit to and is a continuation-in-part of U.S. patent application Ser. No. 12/215,638, filed on Jun. 27, 2008, now U.S. Pat. No. 7,879,305 B2 which is a continuation of PCT Application No. PCT/US2006/049411, filed on Dec. 28, 2006, which claims benefit to U.S. Provisional Patent Application No. 60/755,959, filed on Jan. 3, 2006, all of which are hereby incorporated by reference for all purposes as if fully set forth herein.

BACKGROUND OF THE INVENTION

1. Field of the Invention

The invention relates to an apparatus and method for reducing contaminants from industrial processes. More particularly, the invention is directed to a method of sequestering pollutants from flue gases in operational plants.

2. Discussion of the Related Art

There are a number of related art methods and apparatuses for reducing contaminants from industrial processes. For example, some potential processes for minimizing or capturing flue gas $CO_2$ emissions include an integrated gasification combined cycle (IGCC), membrane separations, sorbent technologies involving pressure or temperature swing processes, and the use of solvents such as monoethanolamine. See e.g., Herzog, *An Introduction to $CO_2$ Separation and Capture Technologies*, Energy Laboratory Working Paper, Massachusetts Institute of Technology, August 1999, pp. 1-8; Reynolds, et al., New Pressure Swing Adsorption Cycles for Carbon Dioxide Sequestration, Adsorption 11, 2005, pp. 531-536; Atimtay, *Cleaner energy production with integrated gasification combined cycle systems and use of metal oxide sorbents for $H_2S$ clean up from coal gas*, Clean Products and Processes, 2001, 2, pp. 197-208; Kintisch, *Power Generation. Making Dirty Coal Plants Cleaner*, Science, 2007, 317, pp. 184-186. These processes have limitations for widespread practical use as they require capture, separation, and compression of $CO_2$ from flue gas. In addition, concentrated $CO_2$ must be transported to a site where it can be disposed of safely, thereby adding additional cost and potential reemission of contaminants.

Some other related methods for $CO_2$ disposal include storage of $CO_2$ in deep aquifers; injection into saline, oil, and gas reservoirs; and mineral carbonation. See, e.g., Lackner, *A guide to $CO_2$ Sequestration*, Science, 2003, 300, pp. 1677-1678. Implementation of the mineral carbonation process is not suitable for practical industrial applications as it requires a pure (99.9%) carbon dioxide stream for the reaction. Therefore, the process is not a scaleable process, is energy intensive, and also has a slow mass transfer rate.

Moreover, some other related art methods are directed at sequestering $CO_2$ via a mineral carbonation process involving reaction of $CO_2$ with silicate minerals (e.g., calcium, magnesium, aluminum, and iron) and industrial alkaline solids and precipitation of $CO_2$ into carbonate minerals. For example, in a natural weathering process silicate minerals are converted to carbonate minerals by absorbing atmospheric $CO_2$. Similarly, alkaline solids also carbonate naturally because these solids contain thermodynamically unstable oxides, hydroxides, and silicate minerals which can capture and convert $CO_2$ into carbonates. However, the natural mineral carbonation process of silicates and industrial solids is slow and difficult to implement on an industrial scale.

Other related art processes are directed towards a re-carbonation process in which mineral carbonation of silicate minerals and industrial solid wastes is performed. See Reddy, et al, *Solubility relationships and mineral transformations associated with recarbonation of retorted oil shales*, J. Environ. Qual., 1986, 15, pp. 129-133. In this study an aqueous recarbonation process was used in which $CO_2$ was bubbled through oil shale solid waste over a period of about 6 months. The bubbling $CO_2$ dissolved silicate minerals and precipitated calcite in oil shale solid wastes. The study suggested that the carbonation process improved the chemical quality of oil shale solid wastes by reducing the concentration of toxic elements. However, the process is not suitable for practical industrial applications as it has long reaction times, e.g., more than 6 months and requires 1/3 or 1/4 ratio of water to improve reaction rate, it requires a pure (99.9%) carbon dioxide stream, it is energy intensive and it is a batch process.

Humidity cell carbonation is another related art process. In this process oil shale is exposed to solid waste at a $CO_2$ pressure of about 0.004 MPa and a moisture content of about 70 to 80 percent for about 4 days to determine the effect of carbonation on the availability and plant uptake of trace elements. See Reddy, et al., *Availability and plant uptake of trace elements from recarbonated retorted oil shale*, J. Environ. Qual., 1987, 16, pp. 168-171. Studies using cell carbonation suggest that the carbonation process promotes plant growth in oil shale solid wastes by increasing the availability of nutrients and by decreasing the toxicity of trace elements. However, the process is not suitable for industrial applications as it has long reaction times, e.g., 4 days, requires pure (99.9%) carbon dioxide stream, energy intensive, requires water addition and is a batch process.

Another related process tried to improve industrial application by accelerating the mineral carbonation process of solid wastes. See Reddy, et al., *Effects of $CO_2$ pressure process on the solubilities of major and trace elements in oil shale wastes*, Environ. Sci. Technol., 1991, 25, pp. 1466-1469. In this related art process moist oil shale solids were exposed under a $CO_2$ pressure of about 5 psi for about 1 hour. The moist oil shale solids were about 15 to about 20% by weight in the process. This process is not suitable for practical industrial applications as it requires a pure (99.9%) carbon dioxide steam and is a batch process.

Other related art processes have tried to accelerate mineral carbonation conditions for conventional coal, clean coal technology, and oil shale solid wastes. See e.g., Reddy, et al., *Reaction of $CO_2$ with alkaline solid wastes to reduce contaminant mobility*, Water Research, 1994, 28, pp. 1377-1382; Reddy, et al., *Reaction of $CO_2$ with clean coal technology solid wastes to reduce trace element mobility*, Water, Air, Soil Pollut., 1995, 84, pp. 385-398; Reddy, et al., *Electric Power Research Institute (EPRI)*, Palo Alto, Calif., 1995, TR-104840, pp. 1-36. Each of these processes has a number of drawbacks including requiring high pressures, requiring pure (99.9%) carbon dioxide streams, energy intensive and are conducted in batch process.

In addition, some other related art processes have applied accelerated mineral carbonation to different industrial residues. For example, these related art processes used municipal solid waste incinerated fly ash/bottom ash from Netherlands, Sweden, Japan, and South Korea in their carbonation process. See e.g., Meima, et al., *Carbonation processes in municipal solid waste incinerator bottom ash and their effect on the leaching of copper and molybdenum*, Applied Geochemistry, 2002, 17, pp. 1503-1513; Ecke, et al., *A. Carbonation of municipal solid waste incineration fly ash and the impact on metal mobility*, J. Environ. Eng., 2003, 129, pp. 435-440; Kim, *Evaluation of pre-treatment methods for landfill disposal of residues from municipal solid waste incineration*

*Waste Management and Research*, 2003, 21(5), pp. 416-423; Ji-Whan, et al., *Characteristic of Carbonation Reaction from Municipal Solid Waste Incinerator Bottom Ash as a Function of Water Content and Their Effect on the Stabilization of Copper and Lead*, Materials Science Forum, 2007, 544-545, pp. 533-536. Other related art processes have used municipal solid waste incinerated ash and air pollution control residue from United Kingdom. See Fernandez, et al., *A review of accelerated carbonation technology in the treatment of cement-based materials and sequestration of CO2*, Journal of Hazardous Materials 2004, 112 (3), pp. 193-205.

Other related art processes have used steel slag from the Netherlands. See Huijgen, et. al., *Mineral CO Sequestration by Steel Slag Carbonation*, Environ. Sci. Technol., 2005, 39 (24), pp. 9676-9682; Huijgen, et. al., *Carbonation of Steel Slag for $CO_2$ sequestration: Leaching of products and reaction mechanisms*, Environ. Sci. Technol. 2006, 40, pp. 2790-2796; Another related art process has used paper mill ash from Spain. See Perez-Lopez, *Carbonation of alkaline paper mill waste to reduce $CO_2$ greenhouse gas emissions into atmosphere*, Applied Geochemistry, 23, 8, 2008, pp. 2292-2300. Still another related art process has used hospital solid waste incinerated ash from Italy. See Baciocchi, et al., *$CO_2$ sequestration by direct gas-solid carbonation of APC residues*, Energy & Fuels, 2006, 20, pp. 1933-1940. All these related art processes are not suitable for practical industrial applications as they require high temperatures, water, high pressures, pure (99.9%) carbon dioxide streams, and are energy intensive.

In addition to accelerated mineral carbonation studies, several investigators examined aqueous mineral carbonation ex-situ processes to sequester $CO_2$. For example, in one process wollastonite, a calcium silicate mineral, was used to sequester $CO_2$ as described by Huijgen, et al., *Mechanisms of aqueous wollastonite carbonation as a possible $CO_2$ sequestration process*, Chemical Engineering Science, 2006, 61, pp. 4242-4251. In another related process primary minerals such as calcium, iron, and magnesium silicate minerals were used for mineral carbonation as described by Gerdemann, et al., *Ex Situ Aqueous Mineral Carbonation*, Environ. Sci. Technol. 2007, 41, pp. 2587-2593. There are drawbacks with these aqueous mineral carbonation processes of silicate minerals as they are energy intensive and require mining, milling, and transport of silicate minerals to a carbonation plant, thereby making them expensive and unsuitable for large scale industrial processing. In addition, these processes require a concentrated source of pure $CO_2$ to work efficiently. In another related art process, coal combustion fly ash and paper mill waste were suggested for use in an aqueous mineral carbonation process as a viable approach to reduce $CO_2$ emissions. See Fernandez Bertos, et al., *A review of accelerated carbonation technology in the treatment of cement-based materials and sequestration of $CO_2$*, Journal of Hazardous Materials, B, 112, 2004, pp. 193-205; Perez-Lopez, et al., *Carbonation of alkaline paper mill waste to reduce $CO_2$ greenhouse gas emissions into atmosphere*, Applied Geochemistry, 23, 8, 2008, pp. 2292-2300.

U.S. Pat. No. 5,502,021 describes a related art process that removes contaminants such as purifying exhaust gases, mainly Hg and other nonvolatile metals such as arsenic and selenium, from wastewater. This process requires extensive preparation of a combination of activated reagents. For example, the process requires foaming and slaking with water to increase the surface area of reactive reagents from different sources. This process is also very energy intensive as it requires temperatures between about 150° C. to about 200° C. for its operation.

U.S. Patent Application Publication No. 2005/0002847 A1 describes a related art aqueous mineral carbonation process to sequester $CO_2$ gas. This process uses sorbents in the aqueous system by activating through physical and chemical processes. The physical activation includes reacting sorbents with steam and air at high temperatures of about 300° C. to about 650° C. for about 3 hours, thereby expending a large amount of energy. In addition, the process discloses an activation process by reacting sorbents with a suite of acids and bases for about 4 to about 24 hours. Accordingly, this process is very complex, energy intensive, and requires a pure, concentrated stream of $CO_2$.

SUMMARY OF THE INVENTION

Accordingly, the present invention is directed to an apparatus and method to sequester contaminants that substantially obviate one or more of the problems due to limitations and disadvantages of the related art.

An advantage of an embodiment of the invention is to provide a rapid mass transfer rate.

Another advantage of another embodiment of the invention is to sequester pollutants, such as $CO_2$ and $SO_2$.

Yet another advantage of another embodiment of the invention is to sequester pollutants under near ambient conditions, e.g., pressure and temperature.

Still another advantage of another embodiment of the invention is to sequester pollutants in a low energy intensive manner minimizing a carbon footprint.

Yet another advantage of another embodiment of the invention is to sequester pollutants at a point source of pollution from an industrial process, e.g., ambient conditions of coal fired power plant, thereby not requiring additional energy sources (no parasitic energy load) and embodiments of the invention can be easily retrofit to existing industrial plants, e.g., coal plants.

Additional features and advantages of embodiments of the invention will be set forth in the description which follows, and in part will be apparent from the description, or may be learned by practice of the invention. The features of the invention will be realized and attained by the structure particularly pointed out in the written description and claims hereof as well as the appended drawings.

An embodiment of the invention includes a method of sequestering an impurity. The method of sequestering a contaminant includes reacting an alkaline material with a flue gas containing contaminants to be sequestered. The reaction has a rapid mass transfer rate to sequester at least a portion of the contaminants.

Another embodiment of the invention includes a method of sequestering carbon dioxide from a coal fired plant including reacting an alkaline material with a flue gas containing carbon dioxide gas to be sequestered, such that the reaction has a rapid mass transfer rate to sequester at least a portion of the carbon dioxide.

Yet another embodiment of the invention includes a method of sequestering sulfur dioxide gas from a coal fired plant. The method includes reacting an alkaline material with a flue gas containing sulfur dioxide gas to be sequestered, such that the reaction has a rapid mass transfer rate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
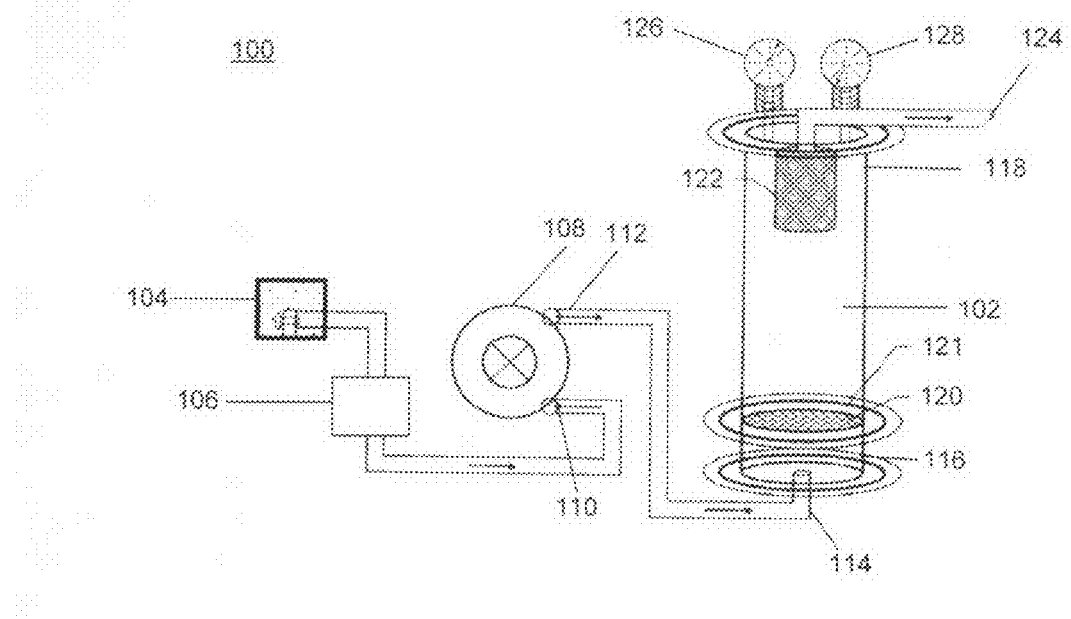
FIG. 1 is a schematic view illustrating a fluidized bed reactor according to an embodiment of the invention.

Atmospheric $CO_2$ gas is essential for life on Earth. However, increasing anthropogenic $CO_2$ levels in the atmosphere are raising concerns over global warming and climate change. Embodiments of this invention are directed towards cost-effective anthropogenic $CO_2$ capturing technologies for point sources, which are safe and environmentally acceptable to address this problem. For example, embodiments of the invention are directed towards capturing and storing contaminants at a point source. A gas-solid reaction is implemented to sequester contaminants at industrial plant operational flue gas temperatures and pressures.

Throughout the world by-products are generated from different industrial processes, e.g., coal fired power plants, paper mills, cement kilns, municipal and hospital solid waste incinerators, steel plants, oil shale fired plants, and the like. These by-products include solid, gaseous, liquid or any combination of the same generated from the different industrial processes. See, e.g., Adriano, et al., *Utilization and disposal of fly ash and other coal residues in terrestrial ecosystems: A review*, J. Environ. Quality. 1980, 9, pp. 333-344; Pichtel, *Microbial respiration in fly ash/sewage sludge-amended soils*, Environmental Pollution, Series A 1990, 63, pp. 225-237, both of which are incorporated by reference.

The industrial processes are a major source of anthropogenic $CO_2$ to Earth's atmosphere. For example, the by-products often include flue gases emitted from industrial processes and these gases also contain trace pollutants such as sulfur dioxide, nitrogen oxide, mercury, arsenic, and other pollutants as known in the art. The by-products also may include large quantities of alkaline waste generated from the different industrial processes. Some typical physical properties of flue gas and fly ash produced from coal fired power plants are shown in Table 1.

TABLE 1

Chemical and physical properties of flue gas and fly ash

| Component | Bituminous | Sub-bituminous | Lignite |
|---|---|---|---|
| Flue Gas Composition | | | |
| $CO_2$ | 12-17% | 10-17% | 17% |
| $SO_2$ | 600-1500 ppm | 175-410 ppm | 277 |
| $N_2$ | — | — | — |
| CO | 50 ppm | 9-390 ppm | 1 ppm |
| Hg | Traces | Traces | Traces |
| As | Traces | Traces | Traces |
| Fly Ash Composition | | | |
| $SiO_2$ | 20-60% | 40-60% | 15-45% |
| $Al_2O_3$ | 5-35% | 20-30% | 10-25% |
| $Fe_2O_3$/FeO | 10-40% | 4-10% | 4-15% |
| CaO | 1-12% | 5-30% | 15-40% |
| MgO | 0-5% | 1-6% | 3-10% |
| $Na_2O$ | 0-4% | 0-2% | 0-10% |
| $K_2O$ | 0-3% | 0-4% | 0-4% |
| $SO_3$ | 0-4% | 0-2% | 0-10% |
| $P_2O_5$ | — | 0.25% | — |
| $TiO_2$ | — | 1.7% | — |
| $CaCO_3$ | — | <0.001% | — |
| Moisture | — | 0.042% | — |
| L.O.I. | 0-15% | 0-3% | 0-5% |
| Particle Size | — | 40 μm | — |

Of the total fly ash produced in many industrial processes only about 20% to about 30% is used in construction and the remaining amount about (70% to 80%) is disposed in landfills. For example, in 2007 U.S. coal fired power plants produced about 125 million tons of fly ash and bottom ash. See *American Coal Ash Association* 2007 *Production and Use Survey*, http://www.acaa-usa.org/displaycommon.cfm?an=1& subarticlenbr=3, Nov. 5, 2008, which is hereby incorporated by reference.

In addition, disposed solids can release pollutants such as arsenic and selenium into the environment. Land disposal of these disposed solids tends to inhibit nutrient cycling because few microorganisms and plants can survive in high alkaline conditions and trace element concentrations. See, e.g., Adriano, et al., *Utilization and disposal of fly ash and other coal residues in terrestrial ecosystems: A review*, J. Environ. Qual. 1980, 9, pp. 333-344; Pichtel, et al., *Microbial respiration in fly ash/sewage sludge-amended soils*, Environmental Pollution, Series A 1990, 63, pp. 225-237; Tyson, *Proceedings of the Third Annual Conference on Unburned Carbon on Utility Fly Ash*, US Department of Energy, FETC, May 1997, all of which are hereby incorporated by reference as if fully set forth herein.

Embodiments of the invention are directed towards capturing and storing contaminants at a point source, e.g., contaminants may be mineralized into the alkaline material. For example, one embodiment is directed towards a method of sequestering an impurity including reacting alkaline material with a flue gas containing contaminants in order to sequester at least a portion of the contaminants. The reaction has a rapid mass transfer rate. In a preferred embodiment, the rapid mass transfer is an initial mass transfer rate for sequestering $CO_2$ gas and ranges from about 0.01 mols/second to about 0.02 mols/second of $CO_2$. This is further described in the Experimental Section below.

The alkaline material includes by-products generated from different industrial processes including, e.g., coal fired power plants, paper mills, cement kilns, municipal and hospital solid waste incinerators, steel plants, oil shale fired plants, combinations thereof and the like.

Some typical chemical and physical properties of different by-products generated from industrial process that may be used as alkaline material are shown in Table 2.

TABLE 2

Chemical and physical properties of different solid wastes.

| Component | Hospital Solid Waste Incinerated Ash | Municipal Solid Waste Incinerated Ash | Paper Mill Solid Waste Ash | Steel Slag Ash | Oil Shale Solid Waste Ash |
|---|---|---|---|---|---|
| $SiO_2$ | 19-39% | 8-20% | 13-38% | 10-18% | 26-32% |
| $Al2O_3$ | 10-13% | 4-13% | 2-17% | 1-2% | 6-7% |
| $Fe_2O_3$ | 1-6% | 1-3% | 1-2% | 8-35% | 2-3% |
| CaO | 12-19% | 13-20% | 27-28% | 30-48% | 40-50% |
| MgO | 2-5% | 1-3% | 2-4% | 6-15% | 0.8-3% |
| $Na_2O$ | 4-9% | 7-14% | 0.5-1% | <1% | <1% |
| $K_2O$ | 3-8% | 4-9% | 2-2.5% | <1% | — |
| $SO_3$ | 4% | 4-15% | <1% | <1% | 9% |
| $P_2O_5$ | 1-2% | 1-3% | 0.8-1% | 0.7-1.3% | 4-5% |
| $TiO_2$ | 2-3% | 1-3% | <1% | 0.5-1.3% | 0.5-1% |
| $CaCO_3$ | ND | ND | ND | ND | ND |
| Moisture | ND | ND | ND | ND | ND |
| L.O.I. | — | 3% | 48% | 1-2% | — |
| Particle Size | <100 um | <100 um | <100 um | <100 um | <100 um |
| pH | >12 | >12 | >12 | >12 | >12 |

The alkaline materials include various oxides including oxides of alkaline earth metal, for example, oxides of Group IIA of the periodic table, and more preferably, oxides such as Al, Fe, Na, K, Si, Ti, Cd, Pb and combinations of the same. In addition, alkaline materials include ash materials such as fly ash produced from industrial operations. Some examples of ash have compositions as described in Tables 1 and 2 above and Table 3 below. In one embodiment, the alkaline material has moisture content less than about 10% and more preferably less than about 1%. In another embodiment, the alkaline material has a particle size of less than 500 μm and preferably less than 40 μm. As the particle size is decreased the reaction may be increased as the surface area is increased.

The flue gas is also from any industrial process such as coal fired power plants, paper mills, cement kilns, municipal and hospital solid waste incinerators, steel plants, oil shale fired plants, combinations thereof and the like. In a preferred embodiment, the flue gas is generated from a coal fired plant. The flue gas includes contaminants, e.g., carbon dioxide gas, sulfur dioxide gas, and nitrous oxide gas. Other contaminants such as mercury and arsenic may also be present. A typical composition of flue gas is shown in Tables 1 and 4.

In preferred embodiments, the reaction is a solid-gas reaction to sequester contaminates as described by:

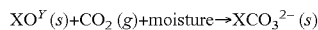

$XO^Y(s) + CO_2(g) + moisture \rightarrow XCO_3^{2-}(s)$

X includes alkaline earth metals, Group IIA elements of the periodic table, and more preferably, elements such as Al, Fe, Na, K, Si, Ti, Cd, Pb and combinations of the same. Also, the charge on X may be $1^+$, $2^+$, or $3^+$. Y may have a charge of $1^+$, $2^+$, or $3^+$. The moisture is already present in the flue gas, that is, additional moisture does not need to be added. Of course, additional moisture may be added if desired. It is also believed that other reaction mechanisms such as solid-aqueous reactions may be used to sequester carbon dioxide as described by Perez-Lopez, et al., *Carbonation of alkaline paper mill waste to reduce $CO_2$ greenhouse gas emissions into atmosphere*, Applied Geochemistry, 23, 8, 2008, pp. 2292-2300, which is hereby incorporated by reference.

FIG. 1 is a schematic view illustrating a fluidized bed reactor according to an embodiment of the invention.

Referring to FIG. 1, an apparatus 100 to sequester contaminants by reacting alkaline material with a flue gas containing contaminants to be sequestered is shown. The apparatus 100 includes a fluidized bed reactor 102 designed and fabricated to sequester contaminants from a flue gas. The fluidized bed reactor 102 is constructed from materials known in the art. In a preferred embodiment, the fluidized bed reactor is constructed from a thermoplastic such as poly(methyl methacrylate) (PMMA) poly(methyl 2-methylpropanoate) material. In addition, a visually transparent material may be desired in order to allow the fluidized bed operation to be observed. Other materials may also be utilized such as metals including, for example, steel, iron, aluminum, and the like.

Flue gas source 104 is a stack from an operational plant, e.g., coal fired power plants, paper mills, cement kilns, municipal and hospital solid waste incinerators, steel plants, oil shale fired plants, and the like. In this embodiment, the flue gas source 104 is from a coal fired plant. Flue gas from the flue gas source 104 is emitted at pressures ranging from about 0.1 atm to about 100 atm, preferably 0.5 atm to about 20 atm, and more preferably 0.8 atm to about 10 atm. Also, flue gas is emitted at temperatures ranging from about −40° C. to about 500° C., preferably temperatures ranging from about 0° C. to about 250° C. and more preferably temperatures ranging from about 15° C. to about 150° C. A moisture control unit 106 is coupled to the flue gas source 104. The moisture control unit 106 is configured to provide or remove moisture as desired to the flue gas. In one embodiment, the moisture control unit 106 controls the moisture of the flue gas such that the flue gas has a moisture content in the range of about 1 to about 80 volume %, preferably about 2 to about 50 volume %, and more preferably 5 to about 20 volume %.

A blower 108 is coupled to the moisture control unit 106 and coupled to the fluidized bed reactor 102. The blower 108 includes a flue gas inlet 110 to receive flue gas from the flue gas source 104 and a flue gas outlet 112 in order to direct the flue gas to the fluidized bed reactor 102 via a flue gas inlet 114.

The fluidized bed reactor 102 includes an operating portion between a first end 116 and a second end 118. The operating portion is preferably cylindrical in geometry, however, other geometries will work. The flue gas inlet 114 is positioned near the first end 116 of the operating portion of the fluidized bed reactor 102.

The operating portion of the fluidized bed reactor 102 further contains a volume of alkaline material as described herein. Preferably, the volume of alkaline material is positioned over a distributor plate 120, e.g., screen. The distributor plate is sealed with a malleable ring 121, e.g., plastic. The distributor plate 120 is positioned within the operating portion below the alkaline material. The distributor plate 120 preferably includes a plurality of openings having a diameter ranging from about 0.5 mm to about 5 mm. The distributor plate has a thickness ranging from about 1 mm to about 15 mm. The number and size of openings depends on the size of the distributor plate 120, e.g., the larger the distributor plate 120 the larger the number of openings. Preferably, the openings are uniform, thereby permitting uniform distribution of the flue gas to penetrate the alkaline material. Of course, the number and size of the holes in the distributor plate 120 may be varied depending on the desired distribution of the flue gas to the alkaline material.

A filter 122 is positioned near the second end 118. The filter 122 is configured to trap particulates. In one embodiment, the filter 122 includes pleated fabric material and is configured to separate the reacted flue gas and return the alkaline material to the volume of the alkaline material for additional contact with fresh flue gas from the flue gas source 104. The reacted gas exits the operating portion of the fluidized bed reactor 102 through a flue gas outlet 124. In addition, a temperature gauge 126 for measuring the temperature within the operating portion and a pressure gauge 128 for measuring the pressure within the operating portion are installed on the fluidized bed reactor. Other measuring devices may also be utilized. Optionally, an IR detector can be connected between the blower 108 and outlet 124 of the fluidized bed reactor. The IR detector may be used to monitor flue gas contaminants, e.g., $CO_2$ and $SO_x$, concentrations before and after reactions.

In some embodiments of the invention, the apparatus 100 is used for sequestering contaminants with parameters shown in Table 3.

TABLE 3

Operating Parameters

| Parameter | Units | | Preferred | More Preferably |
|---|---|---|---|---|
| Solid reactant | | Fly Ash, Serpentine, CaO, MgO, Bottom Ash, Clean Coal Technology (CCT) Ash, Cement Dust, MSWI Ash, Steel Stag, Hospital Incinerator Ash, Oil Shale Ash | Fly Ash, Serpentine, Bottom Ash, CCT Ash, Cement Dust, MSWI Ash, Steel Stag, Hospital Incinerator Ash, Oil Shale Ash | Fly Ash, CCT Ash, Cement Dust, MSWI Ash, Steel Stag, Hospital Incinerator Ash, Paper Mill Ash |
| Solid Particle Size of Alkaline Material | Microns | 1-500 | 5-250 | 10-80 |
| Flue gas | Volume Percent | 1-99 | 5-25 | 10-18 |
| Solid Residence Time | Minutes | 0.01-960 | 0.1-120 | 1-15 |
| Flue Gas Space Velocity | $Sec^{-1}$ | 0.01-600 | 0.1-120 | 0.5-60 |
| Contact Type | — | Fluidized bed, Moving bed, Ebullating bed, Transport reactor, Countercurrent, Co-current | Fluidized bed, Moving bed, Transport reactor | Fluidized Bed |
| Mass Ratio (Solid:Flue gas) | kg/kg | 0.001-1000 | 0.01-100 | 0.05-50 |
| Temperature | ° C. | −40-500 | 0-250 | 15-150 |
| Pressure (absolute) | Atm | 0.1-100 | 0.5-20 | 0.8-10 |
| Source of Flue gas | — | Stack, Side Stream, Downstream of wet gas scrubber, Downstream of pollution control devices | Stack, Downstream of wet gas scrubber | Stack |
| Moisture content of flue gas | Volume Percent | 1-80 | 2-50 | 5-20 |

These parameters should not be construed as limiting as it will be apparent to those skilled in the art that various modifications and variations can be made to embodiments of the invention without departing from the spirit or scope of these embodiments. Thus, it is intended that the embodiments of the invention cover the modifications and variations of this invention provided they come within the scope of the appended claims and their equivalents.

EXAMPLES

Experiments were conducted at the Jim Bridger Power Plant, Point of Rocks, Wyo., where about 30 million kilograms of coal is burned daily using four units to produce about 2240 MW of electricity and serving 6 states in the western United States. All experiments were conducted on unit two at approximately 30 m above ground near the flue gas stack.

The fly ash samples were analyzed for particle size, moisture content, surface area, calcium carbonate content, major mineral phases and surface morphology. Fly ash particle size was estimated using a scanning electron microscope (SEM; JOEL JSM-5800LV). Moisture content of the fly ash was measured by heating samples to about 100° C. in a drying oven (Sargent Analytical Oven) and calculating the difference in mass before and after heating. The surface area of the fly ash was calculated from BET-isotherms. To measure percent calcium carbonate in the fly ash samples, a $CO_2$ coulometer (Coulometrics, Inc. Model 5010) was used to measure the amount of $CO_2$ that evolved from a fly ash sample after acidifying with 10% v/v HCl. Major mineral phases of fly ash were estimated using powdered X-ray diffraction (SCINTAG XDS 2000). To estimate major mineral phases, X-ray diffraction peaks were compared with the Joint Committee on Powder Diffraction Standards (JCPDS) mineral powder diffraction files.

The microscopic composition of fly ash was observed using a high-resolution scanning electron microscope (SEM, JSM-6500F) equipped with an energy-dispersive spectrometer (EDS, Thermo Scientific NanoTrace Si(Li) X-ray detector) operated at an accelerating voltage of 15 kV.

In the experiments a fluidized bed reactor was designed and fabricated to sequester contaminants in the flue gas. The reactor was similar to the one described in FIG. 1. It was constructed of acrylic material to allow the bed operation to be observed. The operating portion of the reactor was about 0.3 m in diameter and about 1.1 m in length. A perforated distributor plate was positioned near a bottom portion of the operating section of the fluidized bed reactor. The distributor plate was formed to have about 307 openings and each opening was about 2 mm in diameter. The openings were used to provide uniform distribution of flue gas through the about 0.6 m deep bed of fly ash positioned about it.

A small blower (1.7 standard cubic meters per minute, HRB600, Republic regenerative blowers) was used to force the flue gas through the fly ash because flue gas from the power plant is just above atmospheric pressure and does not provide sufficient pressure to fluidize the bed. A pleated fabric filter was attached to the top flange of the reactor. The filter allowed the flue gas to pass through the reactor and return the fly ash to the bed for additional contact with new flue gas. Fly ash samples were collected from various ports on the side and top of the reactor during experiments.

An Orion®$^{plus}$ IR detector was connected between the blower and outlet of the fluidized bed reactor. The IR detector was used to monitor flue gas contaminants, e.g., $CO_2$ and $SO_2$, concentrations before and after reactions. The temperature and pressure of the system were monitored by mechanical gauges at the top of the reactor during operation.

Prior to conducting each experiment about 23 kg of fly ash was collected from the electrostatic precipitators and placed in the fluidized bed reactor. The flue gas was accessed from one of the exit ports of the coal fired plant stack and passed through the fluidized bed reactor containing fly ash for about 2 hours. The amount of time was dependent upon the experiment. The temperature during the reactions ranged from about 43° C. to about 54° C. and pressure ranged from about 0.88 to about 1.14 bars.

Fly ash samples were collected at 2, 8, 15, 30, 45, 60, 75, and 120 minutes. The fly ash samples reacted with flue gas were measured for percent calcium carbonate ($CaCO_3$) content. In addition, flue gas reacted fly ash samples were analyzed with SEM-EDS and PXRD to examine surface morphology, chemical and mineral compositions. The concentrations of $CO_2$ gas and of $SO_2$ gas in the flue gas before and after reactions were analyzed using an Orion®$^{plus}$ IR detector. The $SO_2$ gas and $CO_2$ gas detection limits were 0.1 ppm and 0.1%, respectively. Accuracy of the Orion®$^{plus}$ IR detector was checked by comparing the concentration of $CO_2$ with the CEMS of the Jim Bridger power plant.

To balance $CO_2$ gas removed versus $CO_2$ gas mineralized, the amount of $CO_2$ removed from flue gas with the concentration of $CO_3$ in reacted fly ash was compared. The amount of $CO_2$ in unreacted and reacted flue gas was calculated. Based on the difference in the area under the curves using the trapezoidal method (time vs. $CO_2$ concentration) the amount of $CO_2$ removed from flue gas during the first 2.5 minutes of the experiment was calculated. The percent of $CO_2$ removed to percent $CO_3$ mass removed using molecular masses was calculated. The percent of $CO_3$ mass in fly ash after 2.5 minutes of reaction was also calculated.

To estimate the stability of reacted fly ash contaminant water solubility experiments were conducted. Three grams of unreacted and reacted fly ash with 12 mL of distilled deionized water in 50 mL centrifuge tubes. The centrifuge tubes were placed on a mechanical shaker and reacted at 200 revolutions per minute for 7 days. Sample suspensions were filtered through 0.45 μm Millipore filters. Each filtrate was acidified with concentrated nitric acid and analyzed for trace elements using inductively coupled plasma-mass spectrometry (ICP-MS, PE Sciex Elan 6000).

In all the experiments flue gas and fly ash from Jim Bridger power plant was used as shown in Table 4.

TABLE 4

Chemical and Physical Properties of Flue Gas and Fly Ash.

| Parameter | Value |
|---|---|
| Flue Gas | |
| Flow Rate | 50 cfs |
| $N_2$ | 66-70% |
| $CO_2$ | 12-13.6% |
| $SO_2$ | 110-110 ppm |
| NOx | 100-120 ppm |
| CO | 60-750 ppm |
| Hg and As | Traces |
| Moisture | 10-20% |
| Temperature | 40-45° C. |
| pH | 3.33 |
| Fly Ash | |
| $SiO_2$ | 58.6% |
| $Al_2O_3$ | 19.1% |
| $Fe_2O_3$ | 5.4% |
| CaO | 7.5% |
| MgO | 3.9% |
| $Na_2O$ | 0.7% |

TABLE 4-continued

Chemical and Physical Properties of Flue Gas and Fly Ash.

| Parameter | Value |
|---|---|
| $K_2O$ | 0.9% |
| $SO_3$ | 0.6% |
| $TiO_2$ | 1.7% |
| LOI | 0.1-0.3% |
| $CaCO_3$ Content | <0.001% |
| Moisture | 0.04% |
| Total Carbon | <0.2% |
| Particle Size | 40 μm |
| pH | 12.2 |

The average fly ash particle size was about 40 μm in diameter. Moisture content of fly ash was about 0.04% and $CaCO_3$ content was less than about 0.005%. The $CO_2$ readings by the Orion®$^{plus}$ analyzer were similar to the concentration of $CO_2$ measured using the continuous emission monitoring system (CEMS) of the Jim Bridger power plant. On average, measurements with the Orion®$^{plus}$ analyzer were within about 0.2% of the CEMS.

Experiment 1

In Experiment 1, $CO_2$ and $SO_2$ were simultaneously sequestered from the flue gas of the coal fired plant. A fluidized bed reactor as described in the Example section was used. About 23 kg of fly ash having the chemical properties as described in Table 4 was loaded in the reactor. The reactor was run for about 2 hours and samples of fly ash were taken at 2, 8, 15, 30, 45, 60, 75, and 120 minutes. The chemical properties of the flue gas are also described in Table 4.

Figure 2:
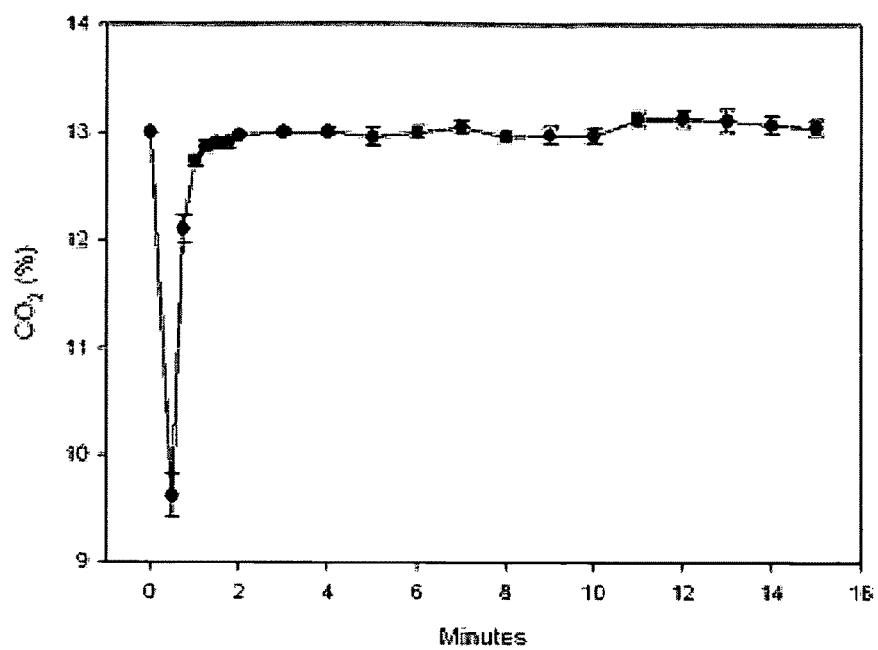
FIG. 2 is a graphical representation of carbon dioxide sequestering via Experiment 1.

FIG. 2 is a graphical representation of carbon dioxide sequestering via Experiment 1. Referring to FIG. 2, the y-axis is the percentage concentration of carbon dioxide gas and the x-axis is the reaction time in minutes. As shown in FIG. 2, the average $CO_2$ concentration decreased from about 13.0% to about 9.6% by reacting with the fly ash during the first minutes of the reaction.

Figure 3:
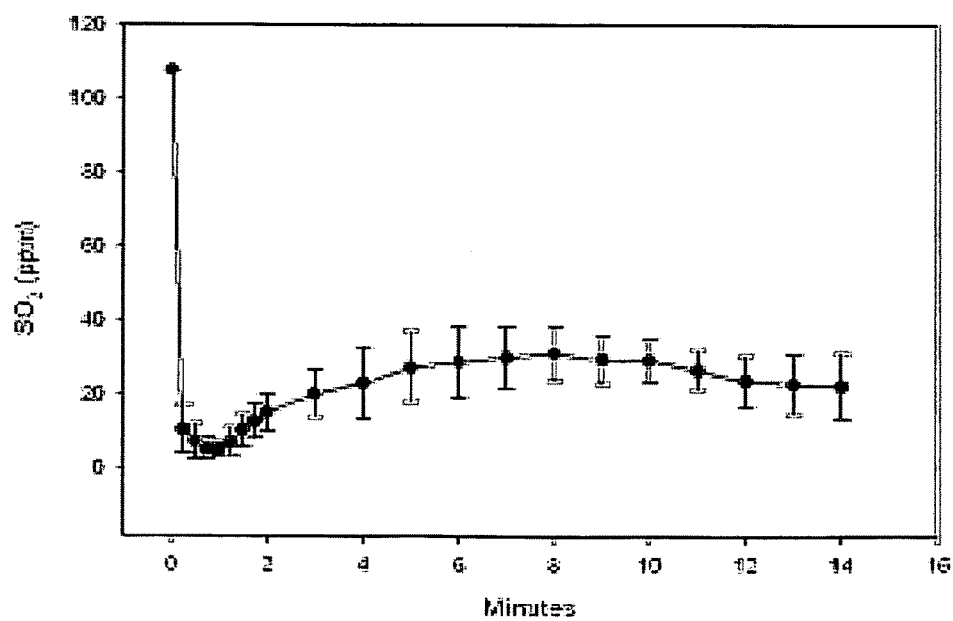
FIG. 3 is a graphical representation of sulfur dioxide sequestrating via Experiment 1.

FIG. 3 is a graphical representation of sulfur dioxide sequestrating via Experiment 1. Referring to FIG. 3, the y-axis represents concentration of sulfur dioxide gas in parts-per-million (ppm) and the x-axis represents the reaction time in minutes. The $SO_2$ concentration decreased from about 110 ppm to about 5 ppm by reacting the flue gas with fly ash during the first few minutes of the reaction.

Figure 4:
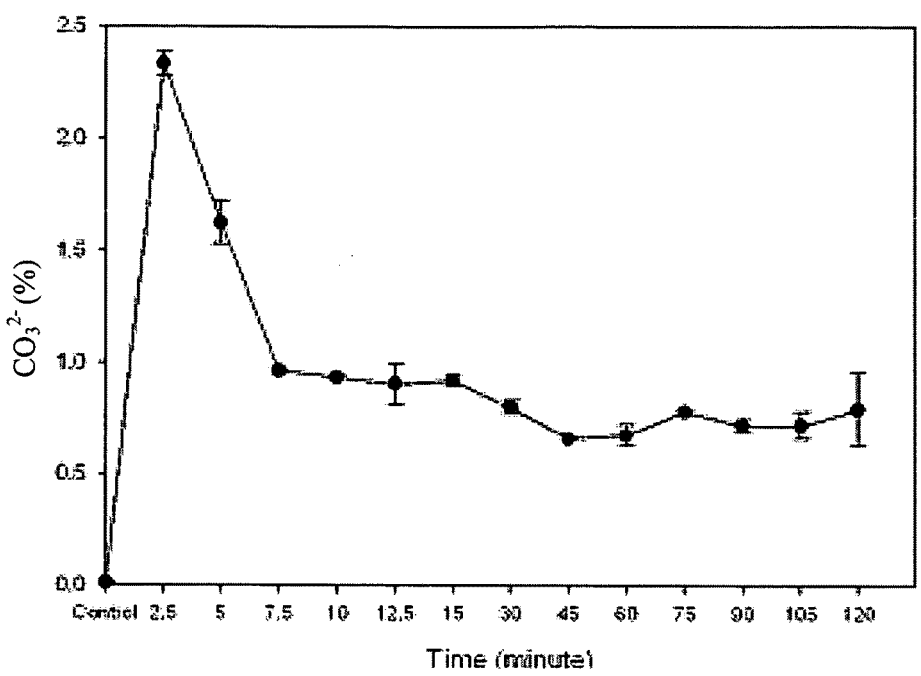
FIG. 4 is a graphical representation according to Experiment 1 illustrating the effect of flue gas reaction on percent of carbonate content.

FIG. 4 is a graphical representation according to Experiment 1 illustrating the effect of flue gas reaction on percent of carbonate content. Referring to FIG. 4, the y-axis units are percent of carbonate $CO_3^{2-}$ and the x-axis units are the reaction time in minutes. In addition to the reduction of $CO_2$ in flue gas, the removal of $SO_2$ from flue gas was observed. The concentration of $SO_2$ in flue gas decreased from 107.5 to 1.1 ppm (FIG. 3) within a few minutes of reaction, probably by being converted to anhydrous $CaSO_4$.

An analysis of flue gas treated fly ash in Experiment 1 was further conducted to determine whether the amount of carbon dioxide removed was substantially equal to the amount of carbonate made in the fly ash. In this analysis a fly ash sample was removed from the fluidized bed reactor at 2 minutes as set forth in Experiment 1. This sample was tested for total carbon with dynamic flash combustion coupled with a gas chromatography (GC) system.

The total carbonate ion was measured in the 2 min fly ash sample and was about 2.43% $CO_3^-$. It was shown that the carbonate ion content in reacted fly ash was similar to the amount of $CO_2$ removed from flue gas, thereby further verifying the results of the experiment. More particularly, in the initial 2 minutes of reaction about 2.83% of $CO_2$ was removed from the flue gas, which translates to about 3.85% of carbonate ion $CO_3^{2-}$. Stated another way, the $CO_2$ content of fly ash was increased by about 1.78%, of which about 2.43% was carbonate ion $CO_3^{2-}$. There is a about a 1.0% difference between the carbonate ion in the reacted fly ash and the carbonate ion of the $CO_2$ gas removed, further confirming the results of the Experiment.

Experiment 2

In this Experiment 2, $CO_2$ and $SO_2$ were simultaneously sequestered from the flue gas of the coal fired plant. A fluidized bed reactor as described in Experiment 1 was used. About 23 kg of fly ash having the chemical properties as described in Table 4 was loaded in the reactor, the reaction was run for 2 hours. A sample of reacted fly ash was taken at about 2 minutes. The chemical properties of the flue gas and fly ash are described in Table 4.

Figure 5A:
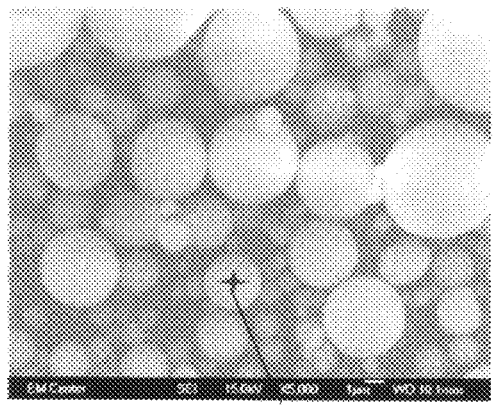
FIG. 5A is a SEM photomicrograph of fly ash prior to reaction in Experiment 2.
Figure 5B:
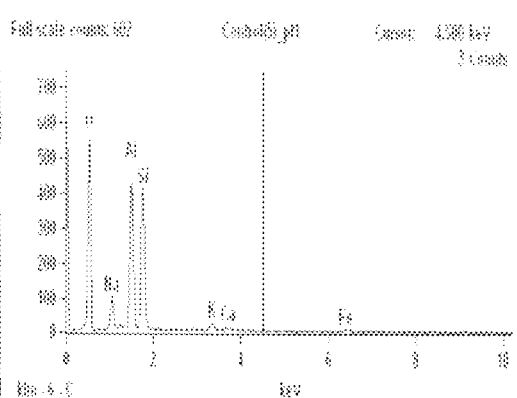
FIG. 5B is an EDS spectra of fly ash prior to reaction in Experiment 2.

FIG. 5A is a SEM photomicrograph of fly ash prior to reaction in Experiment 2. FIG. 5B is an EDS spectra of fly ash prior to reaction in Experiment 2. Referring to FIGS. 5A and 5B, a fly ash sample was taken at location 502 and an EDS spectra was run on the sample. Table 5 below illustrates a mass percent of the control sample shown in FIGS. 5A and 5B.

TABLE 5

Composition of Fly Ash (Control Sample)

| O [mass %] | Na [mass %] | Al [mass %] | Si [mass %] | K [mass %] | Ca [mass %] | Fe [mass %] |
|---|---|---|---|---|---|---|
| 59.08 | 4.43 | 14.50 | 16.7 | 1.56 | 0.86 | 2.8 |

Figure 5C:
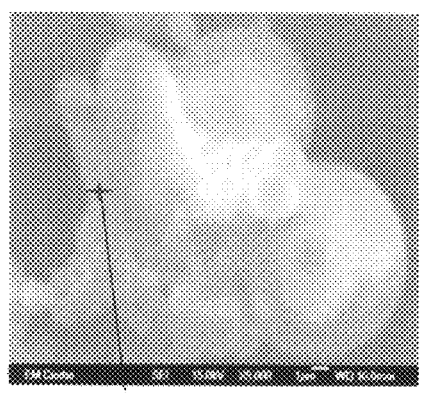
FIG. 5C is a SEM photomicrograph of fly ash after a two minute reaction in Experiment 2.
Figure 5D:
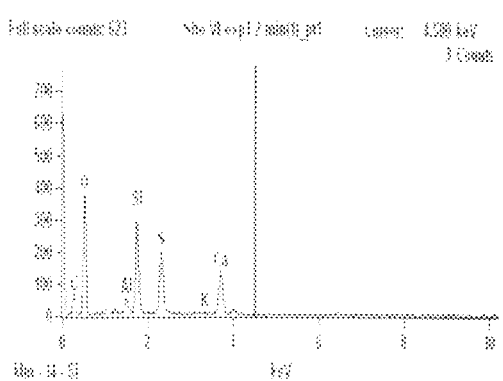
FIG. 5D is an EDS spectra of fly ash after a two minute reaction in Experiment 2.

FIG. 5C is a SEM photomicrograph of fly ash after a two minute reaction. FIG. 5D is an EDS spectra of fly ash in FIG. 5C. Referring to FIGS. 5C and 5D, a fly ash sample was taken at location 504 and an EDS spectra was run on the sample. Table 6 below illustrates a mass percent of the reacted sample shown in FIGS. 5C and 5D.

TABLE 6

Composition of Fly Ash After 2 min. Reaction

| C [mass %] | O [mass %] | Al [mass %] | Si [mass %] | S [mass %] | K [mass %] | Ca [mass %] |
|---|---|---|---|---|---|---|
| 18.65 | 56.51 | 1.05 | 8.45 | 7.20 | 0.30 | 7.83 |

Comparing FIGS. 5A and 5C, it is shown that there is formation of distinct crystal structures. The chemical compositions of many of these mineral crystals include Al, Ca, $CO_3$, $SO_4$, and combinations thereof. In addition, XRD analysis also identified one of the carbonate minerals in the reacted sample as calcite. Therefore, the reaction forms alkaline earth metal carbonates and anhydrous calcium sulfates.

Comparing FIGS. 5B and 5D, it is shown that $CO_2$ and $SO_2$ were sequestered from the flue gas. In particular, there is clearly a C and S spike in FIG. 5D that is not present in the control sample, thereby indicating these elements were removed from the flue gas. In addition, calcium increased indicating C and S were forming carbonates, which was previously verified.

Experiment 3

In this Experiment 3, $CO_2$ and $SO_2$ were simultaneously sequestered from the flue gas of the coal fired plant. A fluidized bed reactor as described in Experiment 1 was used. About 23 kg of fly ash having the chemical properties as described in Table 4 was loaded in the reactor and the reaction was run for 2 hours. A sample of reacted fly ash was taken at about 2 minutes. The chemical properties of the flue gas and fly ash are described in Table 4.

Figure 6A:
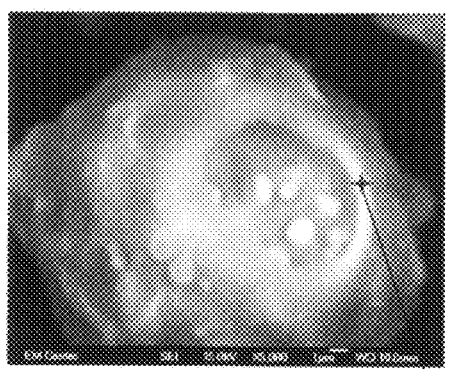
FIG. 6A is a SEM photomicrograph of fly ash after a two reaction in Experiment 3.
Figure 6B:
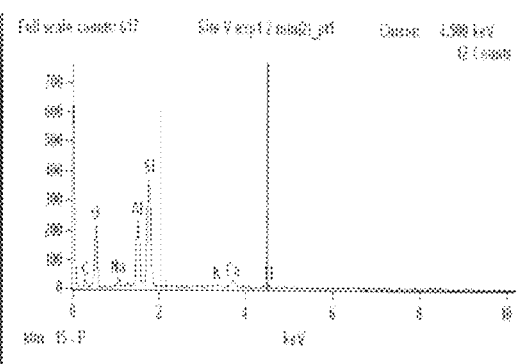
FIG. 6B is an EDS spectra of fly ash after a two reaction in Experiment 3.

FIG. 6A is a SEM photomicrograph of fly ash after a two minute reaction in Experiment 3. FIG. 6B is an EDS spectra of fly ash after a two minute reaction in Experiment 3.

In Experiment 3 the control sample was the same control sample of FIGS. 5A, 5B, and Table 5. Referring to FIGS. 6A and 6B, a fly ash sample was taken at location 602 and an EDS spectra was run on the sample. Table 7 below illustrates a composition of fly ash after the 2 min. reaction in FIGS. 6A and 6B.

TABLE 7

Composition of Fly Ash After 2 min. Reaction

| C [mass %] | O [mass %] | Na [mass %] | Al [mass %] | Si [mass %] | K [mass %] | Ca [mass %] | Ti [mass %] |
|---|---|---|---|---|---|---|---|
| 15.34 | 49.73 | 1.79 | 9.55 | 18.88 | 0.97 | 2.31 | 1.44 |

Comparing FIGS. 5A and 6A, it is shown that there is formation of distinct crystal structures. The chemical compositions of many of these mineral crystals include Al, Ca, Ti, Na, $CO_3$, $SO_4$, and combinations thereof. In addition, XRD analysis also identified one of the carbonate minerals in the reacted sample as calcite. Therefore, the reaction forms alkaline earth metal carbonates and anhydrous calcium sulfates.

Comparing FIGS. 5B and 6B, it is shown that $CO_2$ was sequestered from the flue gas. In particular, there is clearly a C spike in FIG. 6B that is not present in the control sample, thereby indicating these elements were removed from the flue gas. In addition, calcium increased indicating C was forming carbonates.

Experiment 4

In this Experiment, $CO_2$ and $SO_2$ were simultaneously sequestered from the flue gas of the coal fired plant. A fluidized bed reactor as described in Experiment 1 was used. About 23 kg of fly ash having the chemical properties as described in Table 4 was loaded in the reactor and the reaction was run for 2 hours. A sample of reacted fly ash was taken at about 2 minutes. The chemical properties of the flue gas and fly ash are described in Table 4.

Figure 6C:
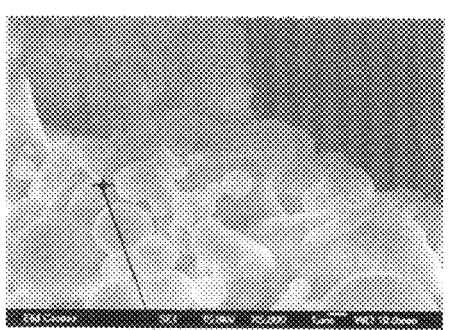
FIG. 6C is a SEM photomicrograph of fly ash after a two minute reaction in Experiment 4.
Figure 6D:
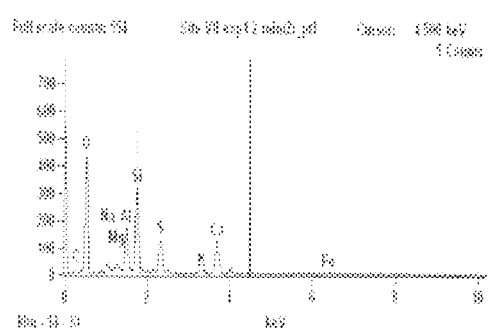
FIG. 6D is an EDS spectra of fly ash after a two minute reaction in Experiment 4.

FIG. 6C is a SEM photomicrograph of fly ash after a two minute reaction in Experiment 4. FIG. 6D is an EDS spectra of fly ash after a two minute reaction in Experiment 4.

In Experiment 4 the control sample was the same control sample of FIGS. 5A, 5B, and Table 5. Referring to FIGS. 6C and 6D, a fly ash sample was taken at location 604 and an EDS spectra was run on the sample. Table 8 below illustrates a composition of the reacted sample shown in FIGS. 6C and 6D.

TABLE 8

Composition of Fly Ash after 2 min. Reaction

| C [mass %] | O [mass %] | Na [mass %] | Mg [mass %] | Al [mass %] | Si [mass %] | S [mass %] | K [mass %] | Ca [mass %] | Fe [mass %] |
|---|---|---|---|---|---|---|---|---|---|
| 8.27 | 57.79 | 1.78 | 0.98 | 4.96 | 10.17 | 5.62 | 0.75 | 7.25 | 2.43 |

Comparing FIGS. 5A and 6C, it is shown that there is formation of distinct crystal structures. The chemical compositions of many of these mineral crystals include Al, Ca, Mg, Na, $CO_3$, $SO_4$, and combinations thereof. In addition, XRD analysis also identified one of the carbonate minerals in the reacted sample as calcite. Therefore, the reaction forms alkaline earth metal carbonates and anhydrous calcium sulfates.

Comparing FIGS. 5B and 6D, it is shown that $CO_2$ and $SO_2$ were sequestered from the flue gas. In particular, there is clearly a C and S spike in FIG. 6B that is not present in the control sample FIG. 5B, thereby indicating these elements were removed from the flue gas. In addition, calcium increased indicating C and S were forming carbonates.

Experiment 5

In Experiment 5, $CO_2$ and $SO_2$ were simultaneously sequestered from the flue gas of the coal fired plant. A fluidized bed reactor as described in Experiment 1 was used. About 23 kg of fly ash having the chemical properties as described in Table 4 was loaded in the reactor and the reaction was run for 2 hours. A sample of reacted fly ash was taken at about 8 minutes. The chemical properties of the flue gas and fly ash are described in Table 4.

Figure 7:
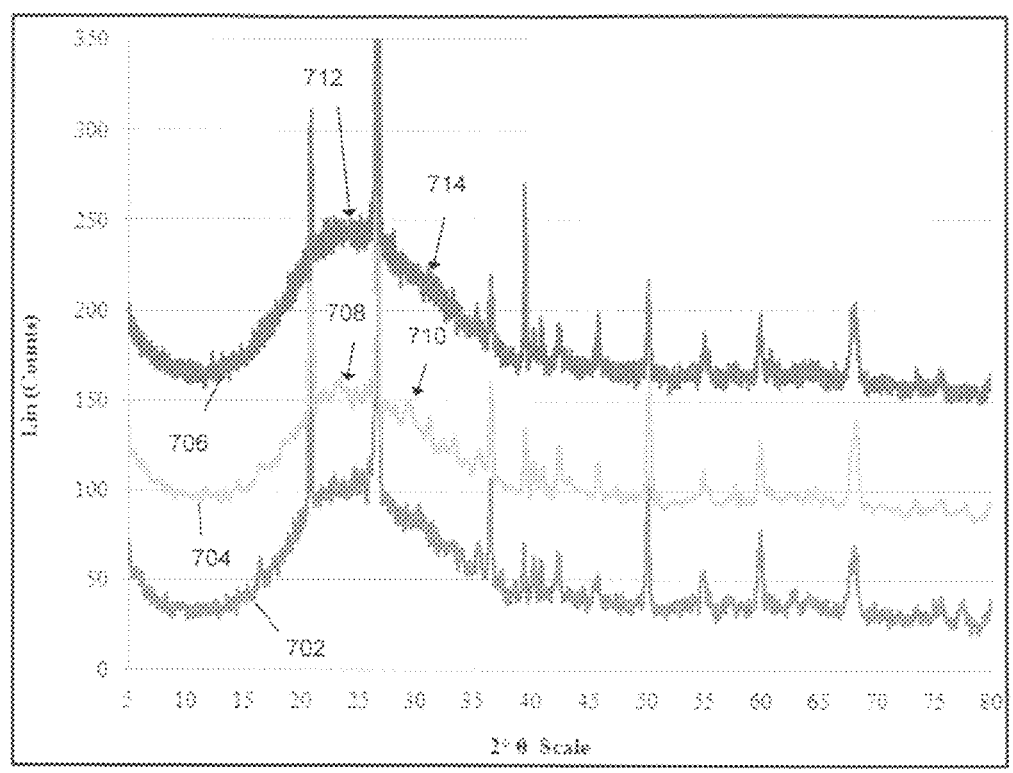
FIG. 7 is a graphical representation of an XRD analysis of a reacted and an unreacted flue gas of Experiment 5.

FIG. 7 is a graphical representation of an XRD analysis of a reacted and an unreacted flue gas. Referring to FIG. 7, the y-axis represents Lin (Counts) and the x-axis is a 2° Scale. The XRD analysis was conducted by running three XRD on three samples. A first XRD analysis 702 was run on a first sample including about a 1-2 gram control sample of unreacted fly ash. A second XRD analysis 704 was run on a second sample including a 1-2 gram reacted fly ash taken after an 8 minute reaction. A third XRD analysis 706 was run on a third sample. The third sample included the second sample treated with HCl acid. More specifically, the third sample was treated with a few mils of 1N HCl for about one minute. The sample was then drained though filter paper and dried in an oven.

Referring to FIG. 7, in the unreacted sample there was no calcite peaks, the reacted sample showed two calcite peaks marked by at 708 and 710. As known in the art this indicates there was enough mass of calcite to show up on the XRD. Also, in the reacted sample treated with HCl the calcite peaks disappeared as shown by 712 and 714. This confirms peaks 708 and 710 were calcite.

Experiment 6

Figure 8:
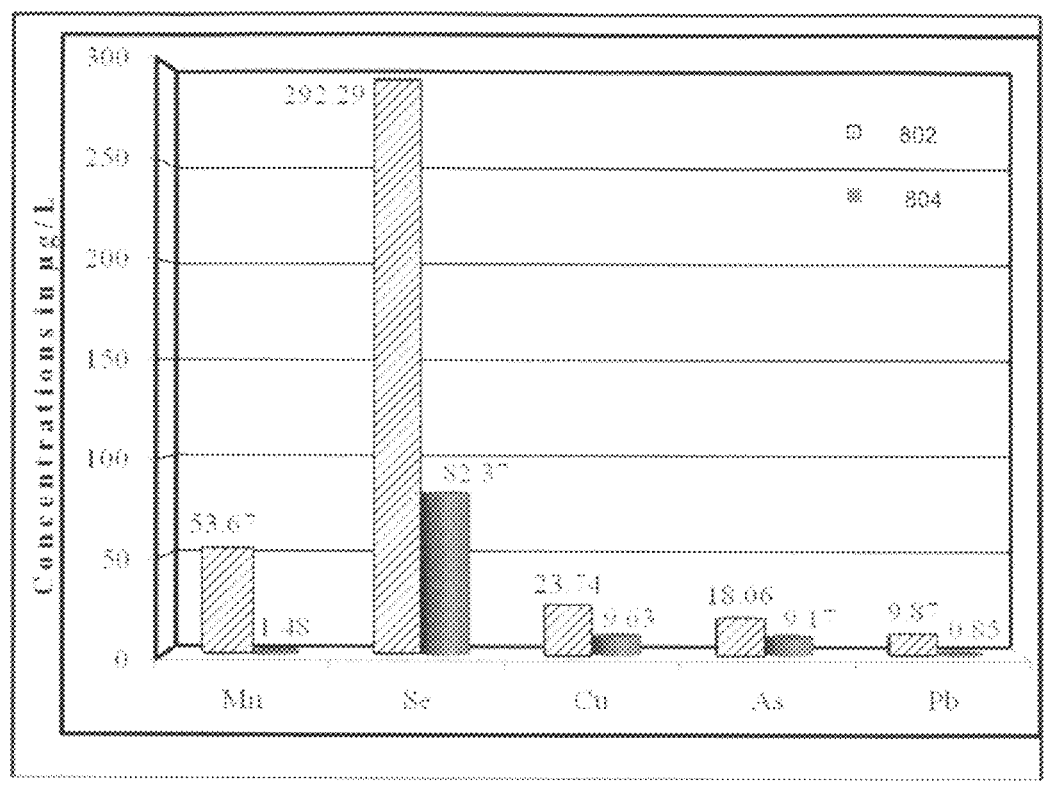
FIG. 8 illustrates the effect of flue gas treatment on solubility of contaminants in fly ash samples Experiment 6.

FIG. 8 illustrates the effect of flue gas treatment on solubility of contaminants in fly ash samples in Experiment 6. In Experiment 6, a standard solubility was performed on a control sample and reacted fly ash sample. The control and reacted fly ash samples were obtained as described in Experiment 2. The procedures for conducting a standard solubility study are known to one of ordinary skill in the art. More specifically, about 2 grams of each sample were reacted separately in water for about 7 days using a shaker. The samples were then filtered and analyzed. The samples were analyzed with an inductively coupled plasma mass spectrometry (ICPMS) tool and the results are shown in FIG. 8. The control sample is 802 and the reacted sample is 804. This Experiment suggests that flue gas $CO_2$ treatment lowered the concentration of several contaminants in the fly ash.

Referring to FIG. 8, it is shown that Se and As concentrations in water leachates were high in control sample 802, 292.3 to 82.3 µg/L, respectively, compared to reacted fly ash sample, 804, being 18.1 to 9.0 µg/L, respectively. Similarly, reacting with flue gas also decreased Mn, Cu, and Pb concentrations in fly ash. A significant reduction in the concentration of several contaminants in reacted fly ash is probably due to both adsorption and co-precipitation processes by the new mineral phases formed through the uptake of $CO_2$. See e.g., Stumm, et al., *Aquatic Chemistry: Chemical Equilibria and Rates in Natural Waters*, 3$^{rd}$ Edition, John Willey & Sons, New York 1996; Theis, et al., *Sorptive behavior of trace metals on fly ash in aqueous systems*, Environ. Sci. Technol., 1977, 11, pp. 1096-1100; and Essington, *Trace element mineral transformations associated with hydration and recarbonation of retorted oil shale*, Environ. Geol., 1989, 13, pp. 59-66, all of which are hereby incorporated by reference as if fully set forth herein.

Experiment 7

In Experiment 7, $CO_2$ and $SO_2$ were simultaneously sequestered from the flue gas of the coal fired plant. A fluidized bed reactor as described in Experiment 1 was used. About 23 kg of fly ash having the chemical properties as described in Table 4 was loaded in the reactor and the reaction was run for 2 hours. A sample of reacted fly ash was taken at about 2 minutes. The chemical properties of the flue gas and fly ash are described in Table 4.

Figure 9A:
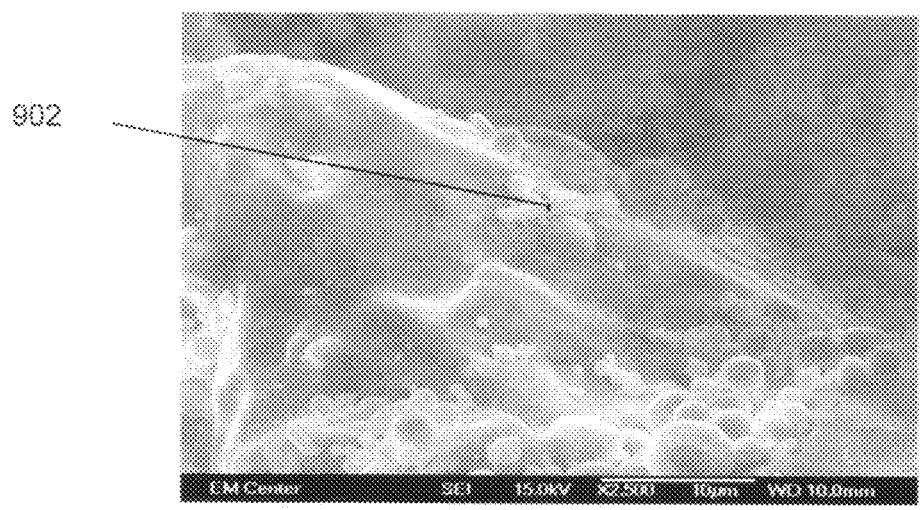
FIG. 9A is a SEM photomicrograph of fly ash after a two minute reaction in Experiment 7.
Figure 9B:
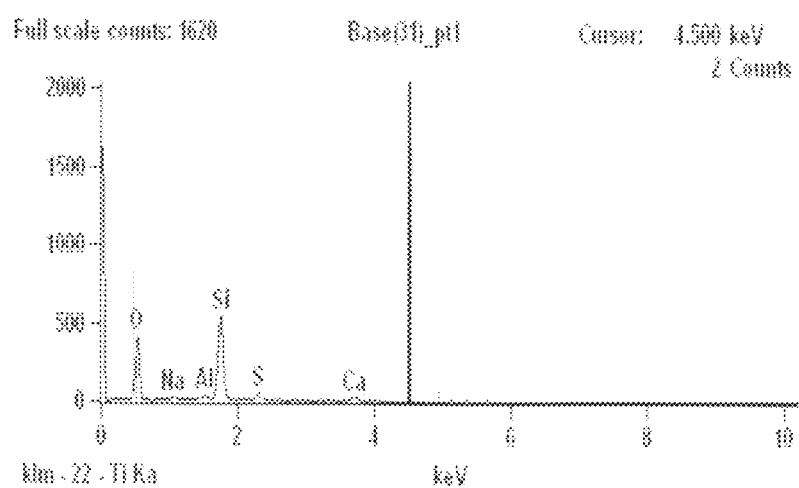
FIG. 9B is an EDS spectra of fly ash after a two minute reaction in Experiment 7.

FIG. 9A is a SEM photomicrograph of fly ash after a two minute reaction in Experiment 7. FIG. 9B is an EDS spectra of fly ash after a two minute reaction in Experiment 7.

The control sample was the same control sample of FIGS. 5A, 5B and Table 5. Referring to FIGS. 9A and 9B, a fly ash sample was taken at location 902 and an EDS spectra was run on the sample. Comparing FIGS. 5A and 9A, it is shown that there is formation of distinct crystal structures. In addition, an XRD analysis also identified one of the carbonate minerals in reacted samples as calcite.

Comparing FIGS. 5B and 9B, it is shown that $SO_2$ was sequestered from the flue gas. In particular, there is clearly an S spike in FIG. 9B that is not present in the control sample of FIG. 5B, thereby indicating this element was removed from the flue gas.

Unlike carbonates in reacted fly ash that degas due to the acidic flue gas, sulfates are not decomposed because anhydrous is more stable. These results were confirmed by the SEM and EDS analysis (FIG. 9A). In addition to removing $SO_2$, it is also expected that this invention can remove Hg (g), As (g), and Se (g) from flue gases.

Experiments 8-10

In these Experiments, $CO_2$ and $SO_2$ were simultaneously sequestered from the flue gas of the coal fired plant. A fluidized bed reactor as described in Experiment 1 was used. About 23 kg of fly ash having the chemical properties as described in Table 4 was loaded in the reactor and the reaction was run for 2 hours and at about 2 minutes a sample of fly ash was taken. The chemical properties of the flue gas are also described in Table 4. This was repeated two additional times for Experiments 9 and 10.

Figure 10:
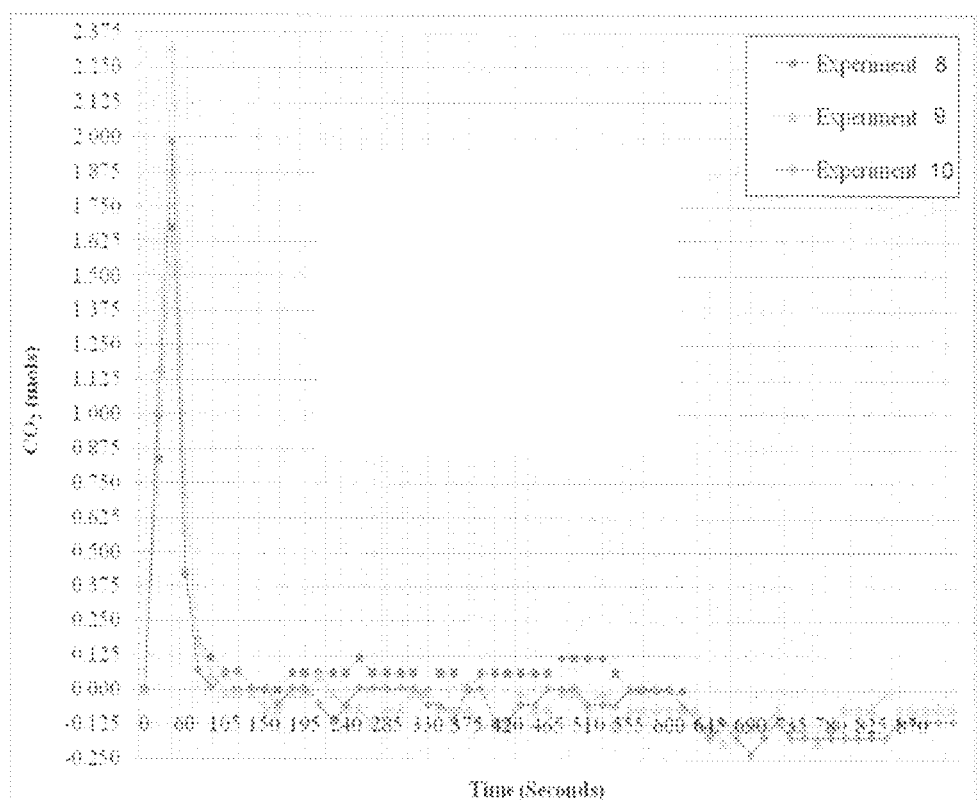
FIG. 10 is a graphical representation of sequestration of carbon dioxide via Experiments 8, 9, and 10.

FIG. 10 is a graphical representation of sequestration of carbon dioxide via Experiments 8, 9, and 10. Referring to FIG. 10, the y-axis represents the molar concentration of carbon dioxide gas and the x-axis represents the reaction time in minutes. As shown in FIG. 10, the average $CO_2$ concentration decreased from about 13.6 to about 9.5 by reacting with the fly ash during the first minutes of the reaction.

The monitoring of the pressure drop for any controlled system under ideal gas conditions allows the kinetic modeling of sequestered $CO_2$. The modeling was done as described in section 3.3. of Perez-Lopez, et al., *Carbonation of alkaline paper mill waste to reduce CO2 greenhouse gas emissions into the atmosphere*, Applied Geochemistry, 23, (2008), pp. 2292-2300, which is hereby incorporated by reference as if fully set forth herein. In particular, equation 1 was used as pseudo-second-order kinetic model.

$$\frac{dn_{total\_CO_{2,t}}}{dt} = k_s(n_{total\_CO_{2,max}} - n_{total\_CO_{2,t}})^2 \quad \text{(Equation 1)}$$

In Equation 1, $k_s$, is a rate constant of sequestered $CO^2$ [mol$^{-1}$s$^{-1}$] for a given initial pressure of $CO^2$ in the system, $N_{total\_CO_{2max}}$ is the maximum sequestered quantity of $CO_2$ at equilibrium [mol], and $N_{total\_CO_{2,t}}$ is the sequestered quantity of $CO_2$ at any time, t, [mol].

An integrated form of Equation 1 for boundary conditions t=0 and t=t and $N_{total\_CO_{2,t}}$=0 to $N_{total\_CO_{2,t}}$=$N_{total\_CO_{2,t}}$ is shown as Equation 2:

$$n_{total\_CO_{2,t}} = \frac{n_{total\_CO_{2,max}} \times t}{\left(\frac{1}{k_s \times n_{total\_CO_{2,max}}}\right) + t} \quad \text{(Equation 2)}$$

For simplification purposes, the constant $t_{1/2}=1/k_s \times N_{total\_CO_{2max}}$ was defined. Physically, $t_{1/2}$ represents the time after which half of the maximum sequestered quantity of $CO_2$ was reached and used to calculate the initial rate of $CO_2$ transfer, which is expressed as V [mol s$^{-1}$]. Equation 3 was used for calculating V.

$$V = \frac{n_{total\_CO_{2,max}}}{t_{1/2}} = k_s(n_{total\_CO_{2,max}})^2 \quad \text{(Equation 3)}$$

The fitting of the kinetic curve using Equation 2 was done with data in FIG. 10. The parameters $t_{1/2}$ and $N_{total\_CO_{2max}}$ were estimated by applying non-linear regression using the least squares method. The results are shown in Table 9.

TABLE 9

Mass Transfer Results

| | Initial $CO_2$ (%) | Max $CO_2$ Decreased (%) at 30 seconds | Difference (%) | Max Sequestered $CO_2$ (mols/minute)* | V - Initial rate of $CO_2$ transfer (mols/second) |
|---|---|---|---|---|---|
| Exp. 8 | 12.1 | 9.3 | 2.8 | 1.68 | 0.014 |
| Exp. 9 | 13.59 | 9.7 | 3.89 | 2.33 | 0.019 |
| Exp. 10 | 12.81 | 9.5 | 3.31 | 1.98 | 0.017 |

*The factor used for converting % $CO_2$ to mols of $CO_2$ is 0.5989.

From FIG. 10 and Table 9, the maximum sequestered $CO_2$ for Experiments 7, 8, and 9 were determined as 1.66, 2.33 and 1.98 [mols/min], respectively. The initial rate of $CO_2$ transfer (V) for Experiments 7, 8 and 9 were calculated as 0.014, 0.019 and 0.017 [mols/sec], respectively. The conversion factor 0.5989 was determined by Equation 4. This conversion factor was helpful converting the % of $CO_2$ mols to mols of $CO_2$.

(50 scf/minute)*(1/100)*(1 lb-mol/379 scf)*(454 gmol/1 lb-mol)=0.5989 (Equation 4)

By way of comparison, the results in Table 9 were compared to other Experiments found in literature as shown in Table 10.

TABLE 10

Comparisons

| | V - Initial rate of $CO_2$ transfer [mols/sec] |
|---|---|
| Exp. 8 | 0.014 |
| Exp. 9 | 0.019 |
| Exp. 10 | 0.017 |
| Comp. 1 | 0.000898 |
| Comp. 2 | 0.000333 |

Referring to Table 10, experimental results from Experiments 8-10 were compared to Comparative Examples 1 and 2. In Comparative Example 1, the initial mass transfer rate (V) of the fly ash was about 0.000898 [mols/sec] and is described in Montes-Hernandez, et al., *Mineral sequestration of $CO_2$ by aqueous carbonation of coal combustion fly-ash*, Journal of Hazardous Materials, 161, 2008, pp. 3147-1354, which is hereby incorporated by reference as if fully set forth herein. In Comparative Example 2, the initial mass transfer rate (V) of the fly ash was about 0.000333 [mols/sec] and is described in Perez-Lopez, et al., *Carbonation of alkaline paper mill waste to reduce CO2 greenhouse gas emissions into the atmosphere*, Applied Geochemistry, 23, (2008), pp. 2292-2300, which is hereby incorporated by reference as if fully set forth herein.

The initial mass transfer rate (V) of Experiments 8, 9, and 10 were compared to Comparative Examples 1 and 2 as shown in table 11 below.

TABLE 11

Results

| 15.59 | Exp. 8/Comp. 1 | 42.04 | Exp. 7/Comp. 2 |
| 21.16 | Exp. 9/Comp. 1 | 57.06 | Exp. 8/Comp. 2 |
| 18.93 | Exp. 10/Comp. 1 | 51.05 | Exp. 9 Comp. 2 |

As shown from Table 11, the initial mass transfer rates (V) of Experiments 8-10 were divided by the initial mass transfer rates (V) of Comparatives Examples 1 and 2. The comparison shows the initial mass transfers rates of Experiments 8-10 were about 18 times faster than those of Comparative Example 1. Also, the initial mass transfer rates (V) of Experiments 8, 9, and 10 are about 50 times faster than those of Comparative Example 2. The initial mass transfer rate (V) depends on the mass of the fly ash used in the experiments, surface area of fly ash, and flue gas composition, reaction mechanism, among other parameters. In Experiments 8, 9, and 10, flue gas containing about 12% to about 14% $CO_2$ was used for the carbonation at pressure in the range from about 0.88 and to about 1.14 bars. On the other hand, the Comparative Examples used pure 99.9% $CO_2$ for carbonation at pressures ranging between 10 and 40 bars. See e.g., Montes-Hernandez, et al., *Mineral sequestration of $CO_2$ by aqueous carbonation of coal combustion fly-ash*, Journal of Hazardous Materials, 161, 2008, pp. 3147-1354.

While the comparative examples have some accelerated mineral carbonation or aqueous mineral carbonation, they were conducted under laboratory conditions and require a pure (99.9%) $CO_2$ source. For industrial operations, a pure (99.9%) $CO_2$ source would involve capture, separation, compression, and transport of $CO_2$ from flue gas to mineral carbonation plant. In addition, the comparative examples require an external water source and long reaction times, e.g., hours, and are energy intensive.

The Experiments suggest that flue gas $CO_2$ converts into calcite and other carbonates quickly form when $CO_2$ contacts fly ash particles. Two probable processes may explain these observations. The flue gas $CO_2$ converted calcium and other oxides present in fly ash into calcite and other carbonates. Alternatively flue gas $CO_2$ was converting silicate minerals in fly ash into carbonates. Other laboratory studies of accelerated carbonation studies also observed the conversion of oxide and silicate minerals to calcite in industrial alkaline by-products. See e.g., Meima, et al., *Carbonation processes in municipal solid waste incinerator bottom ash and their effect on the leaching of copper and molybdenum*, Applied Geochemistry, 2002, 17, pp. 1503-1513; Ecke, et al., *Carbonation of municipal solid waste incineration fly ash and the impact on metal mobility*, J. Environ. Eng., 2003, 129, pp. 435-440; Huijgen, et. al., *Mineral CO Sequestration by Steel Slag Carbonation*, Environ. Sci. Technol., 2005, 39 (24), pp. 9676-9682; Huijgen, et al., *Carbonation of Steel Slag for $CO_2$ sequestration: Leaching of products and reaction mechanisms*, Environ. Sci. Technol., 2006, 40, pp. 2790-2796; and Costa, et al., *Current status and perspectives of accelerated carbonation process on municipal waste combustion residues*, Environ. Monit. Assess, 2007, 135, pp. 55-75, all of which are hereby incorporated by reference as if fully set forth herein. In addition, steel slag carbonation studies conducted by Huijgen et al. provide evidence for leaching of calcium from steel slag particles into solution and precipitation of calcite on the surface of these particles. This study had long reaction times, e.g., greater than about 8 minutes, decomposed calcite and carbonates, and degassed $CO_2$.

It is thought that an increase in the effectiveness in sequestering $CO_2$ also may be achieved by continuously separating the initially reacted fly ash. Of course, the amount of $CO_2$ sequestered likely can be improved through optimization of the reactor design, operating conditions, humidity, and temperature. Because short reaction times at atmospheric pressure and near ambient temperatures are involved, the process described herein is ideal for retrofitting existing plants that produce anthropogenic $CO_2$ as post combustion operation.

The data from Experiments 1-10 of this invention suggest that $CO_2$ from flue gas can be directly captured and stored in alkaline solid waste. Therefore, embodiments of this invention provide an environmentally safe and permanent storage for anthropogenic $CO_2$. The estimated $CO_2$ sequestration capacity of proposed gas-solid reaction, based on $CO_2$ removed from flue gas and typical coal fly ash compositions, is approximately 241 Kg of $CO_2$ per ton of ash, which is much better or comparable to aqueous mineral carbonation processes of paper mill ash (218.17 Kg/ton) or coal fly ash (26.1 Kg/ton). It is believed, that embodiments of the process can sequester about 240 megatons of $CO_2$ per 1 gigaton of ash per year produced in U.S. Since flue gas $CO_2$ and fly ash are readily available at the power plant with short mass transfer times, e.g., about 10 minutes or less, near ambient pressures and temperatures, minimum energy is utilized. Embodiments of this invention are also ideal for retrofitting existing coal power plants as post combustion $CO_2$ and $SO_2$ sequestration operations, i.e., continuous operations, with flow of both flue gas and fly ash into and out of the unit over time. Preliminary cost estimates indicate that implementation of large scale processes according to embodiments of this invention are economically viable alternatives for capturing and storing contaminants in flue gas, e.g., $CO_2$ and $SO_2$. The proposed invention has wide applications for different combustion processes including coal fired power plants, paper mills, cement kilns, municipal and hospital solid waste incinerators, steel plants, and oil shale fired plants, e.g., Tables 1 and 2. Direct capture and storage of flue gas $CO_2$ and $SO_2$ as well as other pollutants (Hg, As, Se) at industrial point sources (stack flue gases) are essential steps to reduce anthropogenic $CO_2$ and $SO_2$ emissions and other pollutants to the atmosphere.

Also, based on $CO_2$ removed from flue gas, the typical carbonate minerals that could be formed in addition to calcite include dawsonite ($NaAl(CO_3)(OH)_2$) and alumohydrocalcite ($CaAl_2(CO_3)_2(OH)_4 \cdot 3(H_2O)$). Thus, the $CO_2$ sequestration capacity was calculated to be 242 Kg of $CO_2$ per ton of fly ash, which is very similar or close to predicted $CO_2$ sequestration by the aqueous mineral carbonation of paper mill waste (218.37 Kg per ton) and wollastonite silicate mineral (329.0 Kg per ton).

It will be apparent to those skilled in the art that various modifications and variations can be made to embodiments of the invention without departing from the spirit or scope of these embodiments. Thus, it is intended that the embodiments of the invention cover the modifications and variations of this invention provided they come within the scope of the appended claims and their equivalents.

What is claimed is:

1. A method of sequestering an impurity, comprising the steps of: reacting an alkaline material with a flue gas containing contaminants to be sequestered, wherein the reaction has a rapid mass transfer rate to sequester at least a portion of the contaminants, and wherein the rapid mass transfer rate comprises an initial mass transfer rate in the range of about 0.01 mols/second to about 0.02 mols/second of $CO_2$.

2. The method of claim 1, wherein the alkaline material comprises an oxide of an alkaline material.

3. The method of claim 1, wherein the alkaline material comprises fly ash.

4. The method of claim 3, wherein the fly ash comprises $SiO_2$ ranging from about 15 to about 60 wt %.

5. The method of claim 3, wherein the fly ash has a composition comprising:
$SiO_2$ ranging from about 20 to about 60 wt %;
$Al_2O_3$ ranging from about 5 to about 35 wt %;
$Fe_2O_3$ ranging from about 10 to about 40 wt %;
CaO ranging from about 1 to about 12 wt %;
MgO ranging from about 0 to about 5 wt %;
$Na_2O$ ranging from about 0 to about 4 wt %;
$K_2O$ ranging from about 0 to about 3 wt %; and
$SO_3$ ranging from about 0 to about 4 wt %.

6. The method of claim 3, wherein the fly ash has a composition comprising:
$SiO_2$ ranging from about 40 to about 60 wt %;
$Al_2O_3$ ranging from about 20 to about 30 wt %;
$Fe_2O_3$ ranging from about 4 to about 10 wt %;
CaO ranging from about 5 to about 30 wt %;
MgO ranging from about 1 to about 6 wt %;
$Na_2O$ ranging from about 0 to about 2 wt %;
$K_2O$ ranging from about 0 to about 4 wt %;
$SO_3$ ranging from about 0 to about 2 wt %;
$P_2O_5$ of about 2 wt %;
$TiO_2$ of about 1.7 wt %; and
$CaCO_3$ less than about 0.001 wt %.

7. The method of claim 3, wherein the fly ash has a composition comprising:
$SiO_2$ ranging from about 15 to about 45 wt %;
$Al_2O_3$ ranging from about 10 to about 25 wt %;
$Fe_2O_3$ ranging from about 4 to about 15 wt %;
CaO ranging from about 15 to about 40 wt %;
MgO ranging from about 3 to about 10 wt %;
$Na_2O$ ranging from about 0 to about 10 wt %;
$K_2O$ ranging from about 0 to about 4 wt %; and
$SO_3$ ranging from about 0 to about 10 wt %.

8. The method of claim 1, wherein the alkaline material has a moisture content of less than about 1%.

9. The method of claim 1, wherein the flue gas comprises flue gas from a coal fired plant.

10. The method of claim 1, wherein the contaminant is selected from the group consisting of carbon dioxide gas, sulfur dioxide gas, nitrogen oxide gas and combinations thereof.

11. The method of claim 1, wherein the contaminant comprises carbon dioxide gas.

12. The method of claim 1, wherein the contaminant comprises sulfur dioxide gas.

13. The method of claim 1, wherein the reacting step comprises reacting the alkaline material with flue gas at a temperature in a range from about 35° C. to about 60° C.

14. The method of claim 1, wherein the reacting step comprises reacting the alkaline material with flue gas at a pressure in a range from about 0.7 bars to about 1.2 bars.

15. The method of claim 1, wherein the reacting step comprises reacting the alkaline material with flue gas in a fluidized bed reactor.

16. The method of claim 1, wherein the alkaline material comprises ash waste material from at least one of hospital solid waste incinerated ash, municipal solid waste incinerated waste ash, paper mill solid waste ash, steel slag ash, and oil shale solid waste ash.

17. The method of sequestering a carbon dioxide impurity from a coal fired plant, comprising the steps of:
reacting alkaline material with a flue gas containing carbon dioxide gas to be sequestered, wherein the reaction has a rapid mass transfer rate to sequester at least a portion of the carbon dioxide; and wherein the rapid mass transfer rate comprises an initial mass transfer rate in the range of about 0.01 mols/second to about 0.02 mols/second of $CO_2$.

18. The method of claim 17, wherein the alkaline material has a moisture content less than about 1%.

19. The method of claim 17, wherein the alkaline material has an average particle size of less than about 500 μm.

20. The method of sequestering sulfur dioxide gas from a coal fired plant, comprising the steps of:
reacting an alkaline material with a flue gas containing sulfur dioxide gas to be sequestered, wherein the reaction has a rapid mass transfer rate to sequester at least a portion of the sulfur dioxide gas and wherein the rapid mass transfer rate comprises an initial mass transfer rate in the range of about 0.01 mols/second to about 0.02 mols/second of $CO_2$.

21. The method of claim 20, wherein the reacting step comprises reacting the alkaline material with sulfur dioxide gas in a fluidized bed reactor.

22. The method of claim 20, wherein the alkaline material comprises fly ash having a composition comprising:
$SiO_2$ ranging from about 15 to about 45 wt %;
$Al_2O_3$ ranging from about 10 to about 25 wt %;
$Fe_2O_3$ ranging from about 4 to about 15 wt %;
CaO ranging from about 15 to about 40 wt %;
MgO ranging from about 3 to about 10 wt %;
$Na_2O$ ranging from about 0 to about 10 wt %;
$K_2O$ ranging from about 0 to about 4 wt %; and
$SO_3$ ranging from about 0 to about 10 wt %.

23. The method of claim 20, wherein the alkaline material is ash waste material including at least one of hospital solid waste incinerated ash, municipal solid waste incinerated waste ash, paper mill solid waste ash, steel slag ash, and oil shale solid waste ash.

24. The method of claim 20, wherein the reacting step simultaneously sequesters carbon dioxide gas and sulfur dioxide gas.

\* \* \* \* \*